US012716857B2

(12) United States Patent
Morishita et al.

(10) Patent No.: US 12,716,857 B2
(45) Date of Patent: Aug. 25, 2026

(54) METHOD OF MEASURING A CONDUCTIVITY OF A LIQUID USING A CONDUCTIVITY SENSOR

(71) Applicant: NGK INSULATORS, LTD., Nagoya (JP)

(72) Inventors: Akifumi Morishita, Komaki (JP); Takao Ohnishi, Fuso-cho (JP)

(73) Assignee: NGK INSULATORS, LTD., Nagoya (JP)

( * ) Notice: Subject to any disclaimer, the term of this patent is extended or adjusted under 35 U.S.C. 154(b) by 142 days.

(21) Appl. No.: 18/794,009

(22) Filed: Aug. 5, 2024

(65) Prior Publication Data

US 2025/0035574 A1 Jan. 30, 2025

Related U.S. Application Data

(63) Continuation of application No. PCT/JP2023/003755, filed on Feb. 6, 2023.

(30) Foreign Application Priority Data

Jul. 7, 2022 (JP) ................................ 2022/004628

(51) Int. Cl.
*G01N 27/04* (2006.01)
*G01N 27/07* (2006.01)

(52) U.S. Cl.
CPC ........... *G01N 27/07* (2013.01); *G01N 27/045* (2013.01)

(58) Field of Classification Search
CPC ............................ G01N 27/07; G01N 27/045
USPC ............................ 324/500, 600, 76.11, 693
See application file for complete search history.

(56) References Cited

U.S. PATENT DOCUMENTS 4,948,263 A 8/1990 Herrmann et al.
5,519,323 A * 5/1996 Kordas ................. G01N 27/06 257/532

(Continued)

FOREIGN PATENT DOCUMENTS

JP 63-169545 A 7/1988
JP 64-009352 A 1/1989

(Continued)

OTHER PUBLICATIONS

International Preliminary Report on Patentability received in corresponding International Application No. PCT/JP2023/003755 dated Aug. 22, 2024.

(Continued)

*Primary Examiner* — Huy Q Phan
*Assistant Examiner* — Trung Q Nguyen
(74) *Attorney, Agent, or Firm* — MATTINGLY & MALUR, PC

(57) ABSTRACT

A conductivity measurement method includes: a) measuring a first complex impedance between a first detection electrode and a second detection electrode at a first frequency with a liquid being in contact with a protective layer to face each of the first and second detection electrodes through the protective layer; b) extracting a first extraction value from the first complex impedance according to an extraction rule; c) determining whether the first extraction value is within a tolerance; d) deciding a conductivity of the liquid based on the first extraction value when it is determined that the first extraction value is within the tolerance in c); and e) deciding the conductivity of the liquid based on a second extraction value extracted according to the extraction rule from a second complex impedance at a second frequency when it is determined that the first extraction value is outside the tolerance in c).

20 Claims, 15 Drawing Sheets

(56) References Cited

U.S. PATENT DOCUMENTS

| | | | |
|---|---|---|---|
| 2006/0096370 A1 | 5/2006 | Isogai et al. | |
| 2008/0100309 A1 | 5/2008 | Yoshida et al. | |
| 2009/0095073 A1 | 4/2009 | Fukumura et al. | |
| 2009/0315574 A1 | 12/2009 | Akiyama et al. | |
| 2019/0187085 A1 | 6/2019 | Brom-Verheyden et al. | |
| 2020/0041452 A1* | 2/2020 | Duarte | G01N 27/223 |
| 2020/0049649 A1 | 2/2020 | Schreivogel | |
| 2023/0091344 A1 | 3/2023 | Morishita | |
| 2025/0025347 A1* | 1/2025 | Hill | A61F 13/38 |

FOREIGN PATENT DOCUMENTS

| | | |
|---|---|---|
| JP | 11-304856 A | 11/1999 |
| JP | 2006-133191 A | 5/2006 |
| JP | 2008-111669 A | 5/2008 |
| JP | 2009-002693 A | 1/2009 |
| JP | 2009-092633 A | 4/2009 |
| JP | 2011-080814 A | 4/2011 |
| JP | 2019-028012 A | 2/2019 |
| JP | 2019-109224 A | 7/2019 |
| WO | 2021/241628 A1 | 12/2021 |

OTHER PUBLICATIONS

International Search Report of PCT/JP2023/003755 dated Apr. 4, 2023.

International Search Report of PCTJP2022/004628 dated Mar. 29, 2022.

Unexamined U.S. Appl. No. 18/794,011, filed Aug. 5, 2024.

* cited by examiner

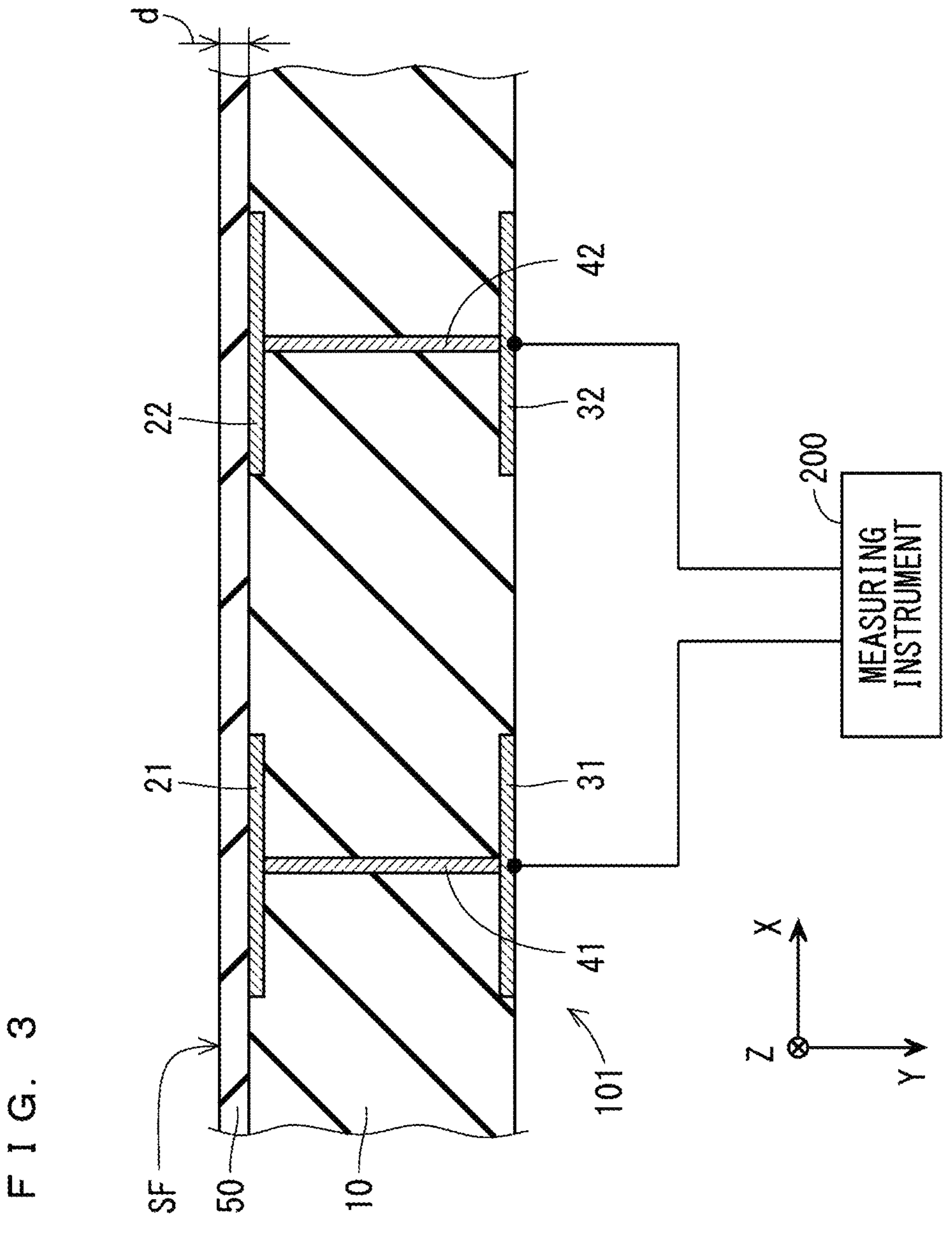
F I G. 3
d
42
22
32
200
MEASURING INSTRUMENT
21
31
41
SF
50
10
101
X
Z
Y

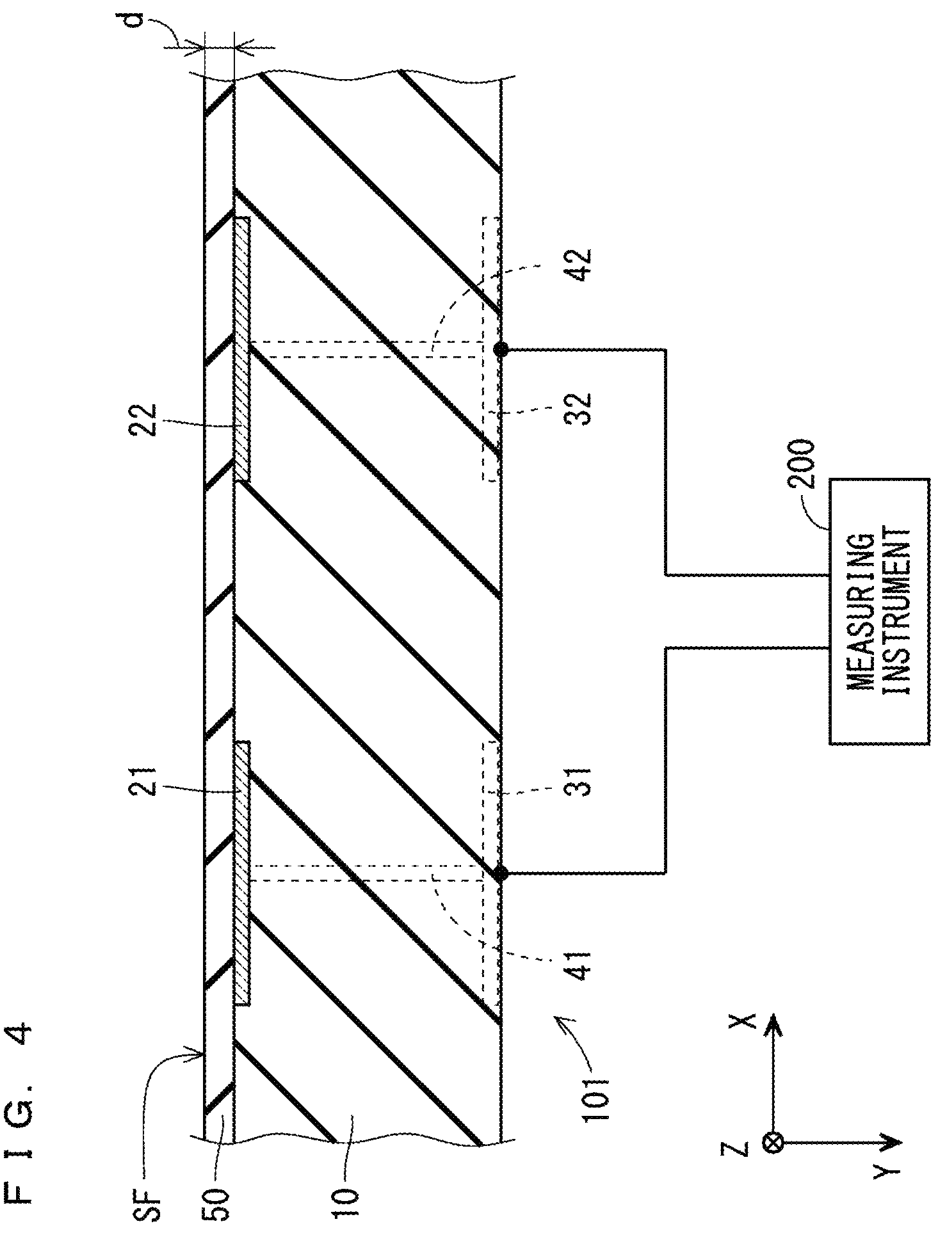
F I G. 4
SF
50
10
101
21
22
31
32
41
42
d
200
MEASURING INSTRUMENT
X
Y
Z

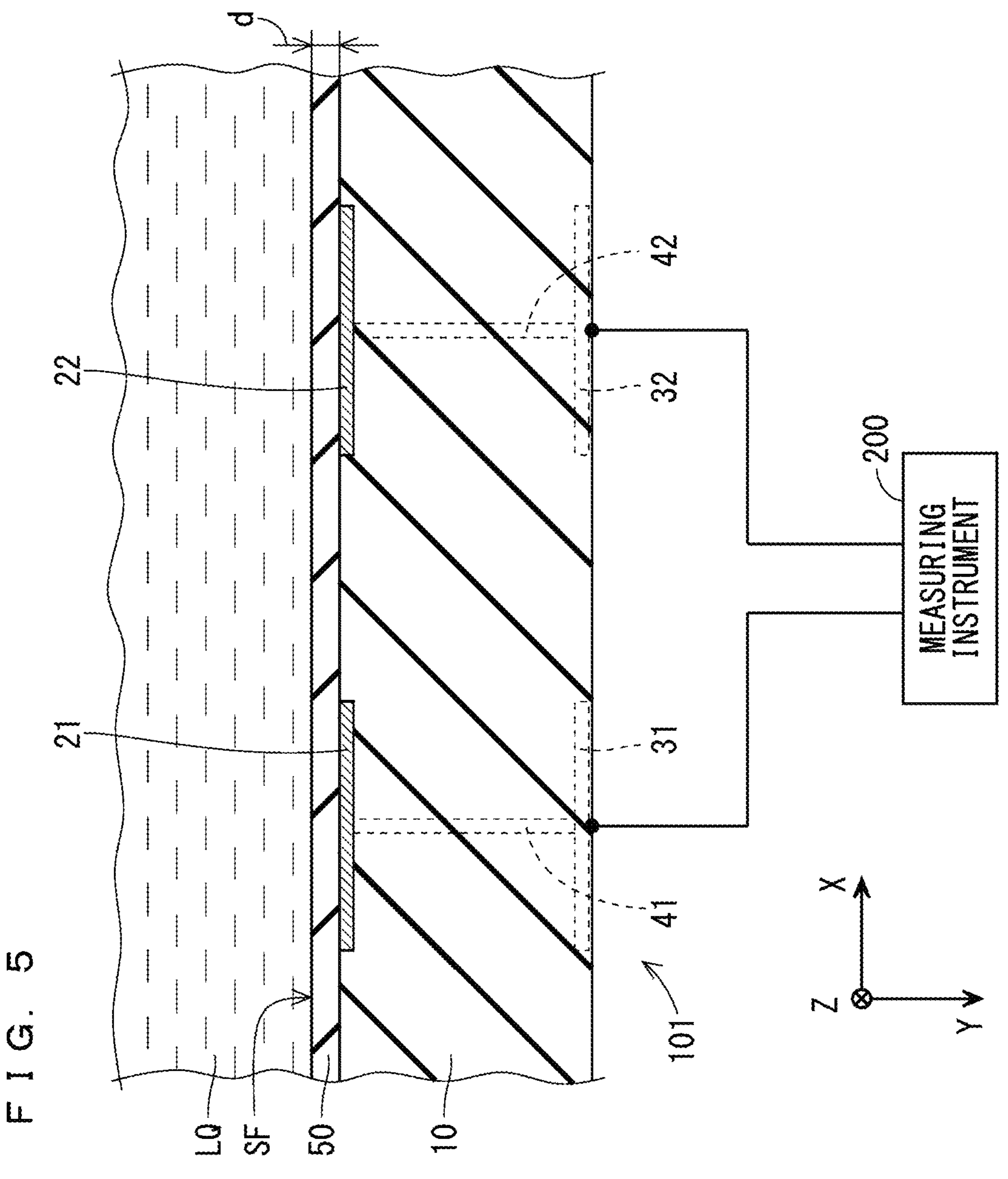
F I G. 5
d
22
21
42
32
31
41
200
MEASURING INSTRUMENT
LQ
SF
50
10
101
X
Y
Z F I G. 7
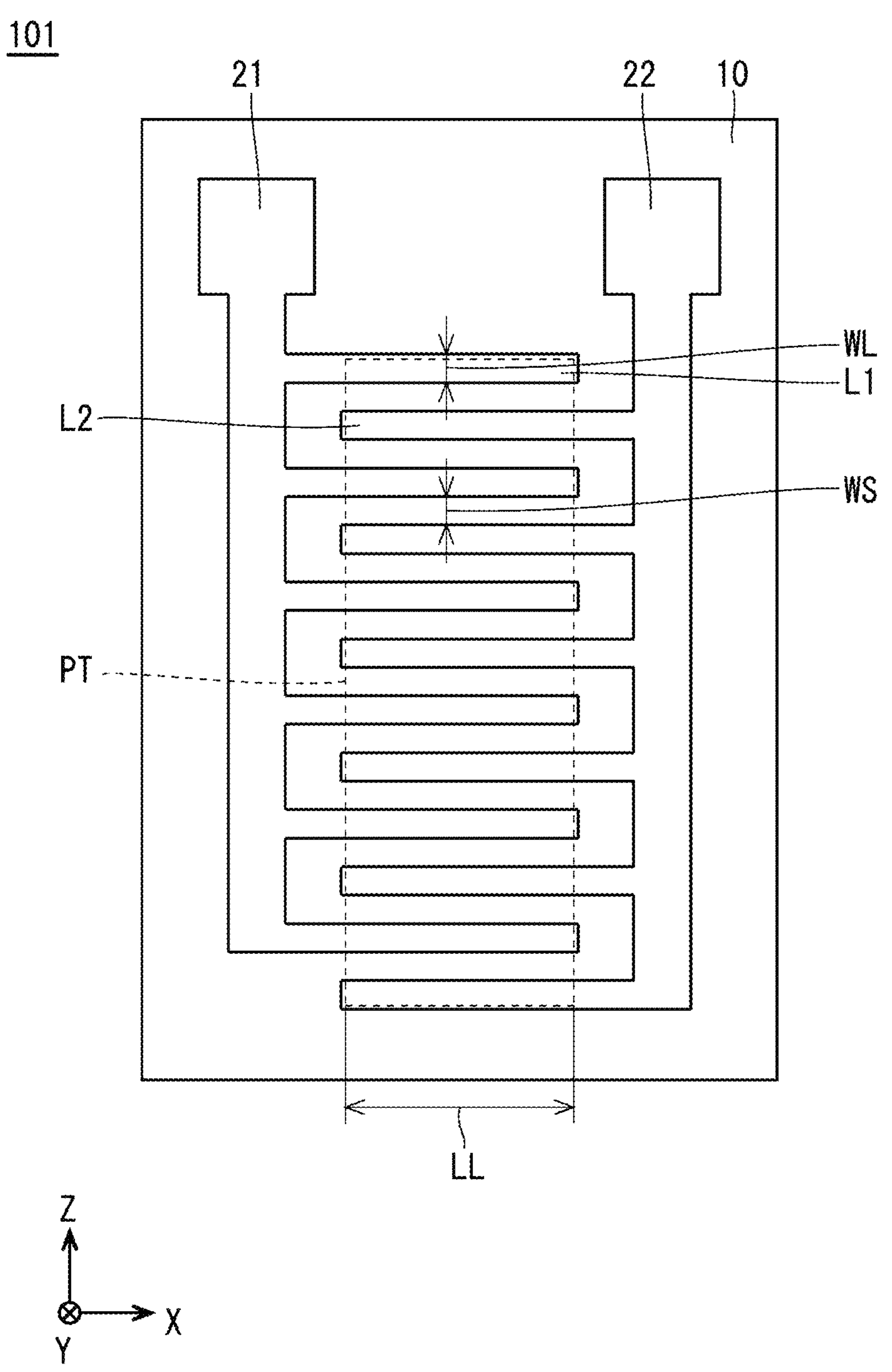

F I G. 8
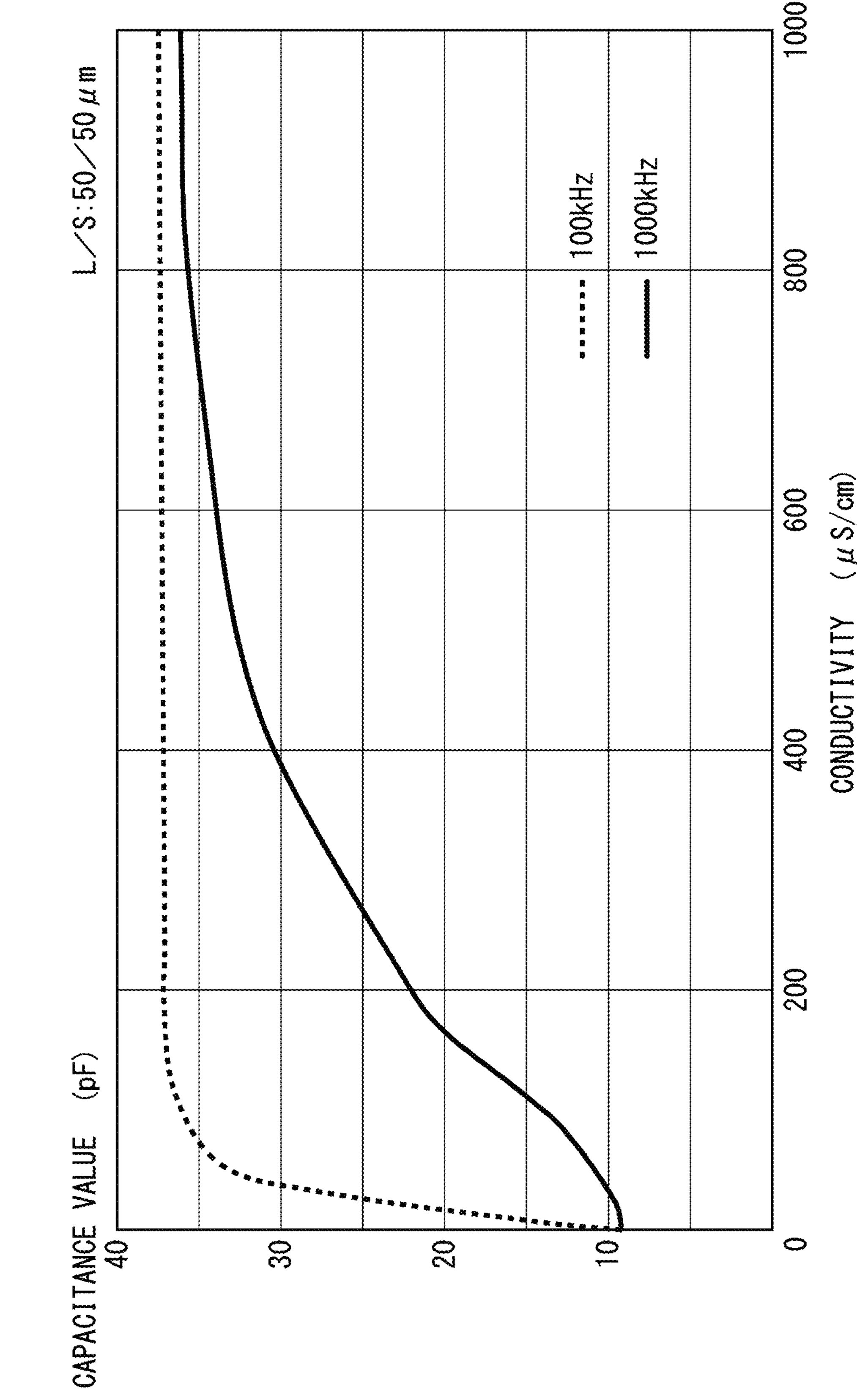

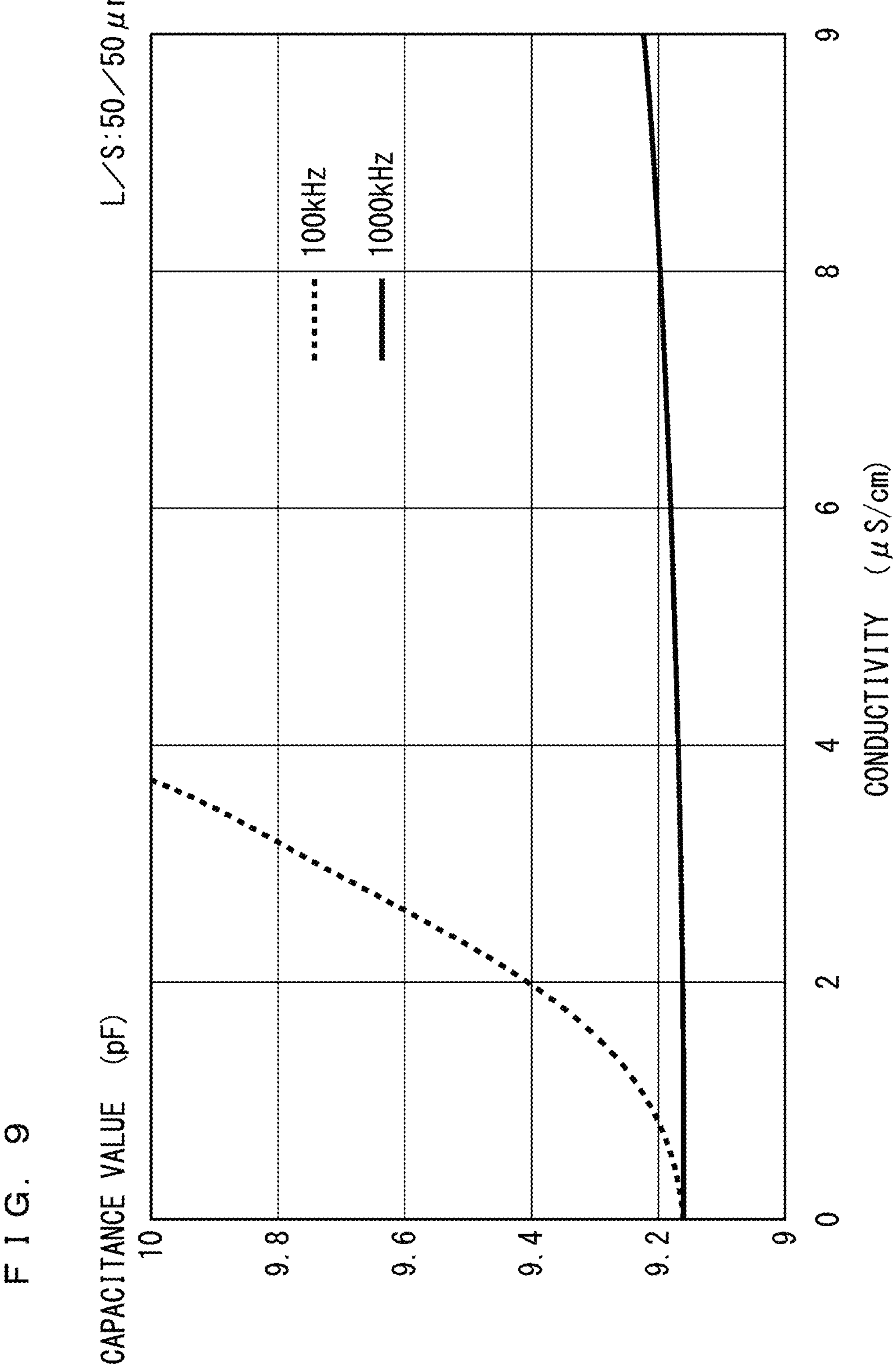
F I G. 9
CAPACITANCE VALUE (pF)
10
9.8
9.6
9.4
9.2
9
0
2
4
6
8
9
CONDUCTIVITY (μS/cm)
L/S:50/50μm
100kHz
1000kHz

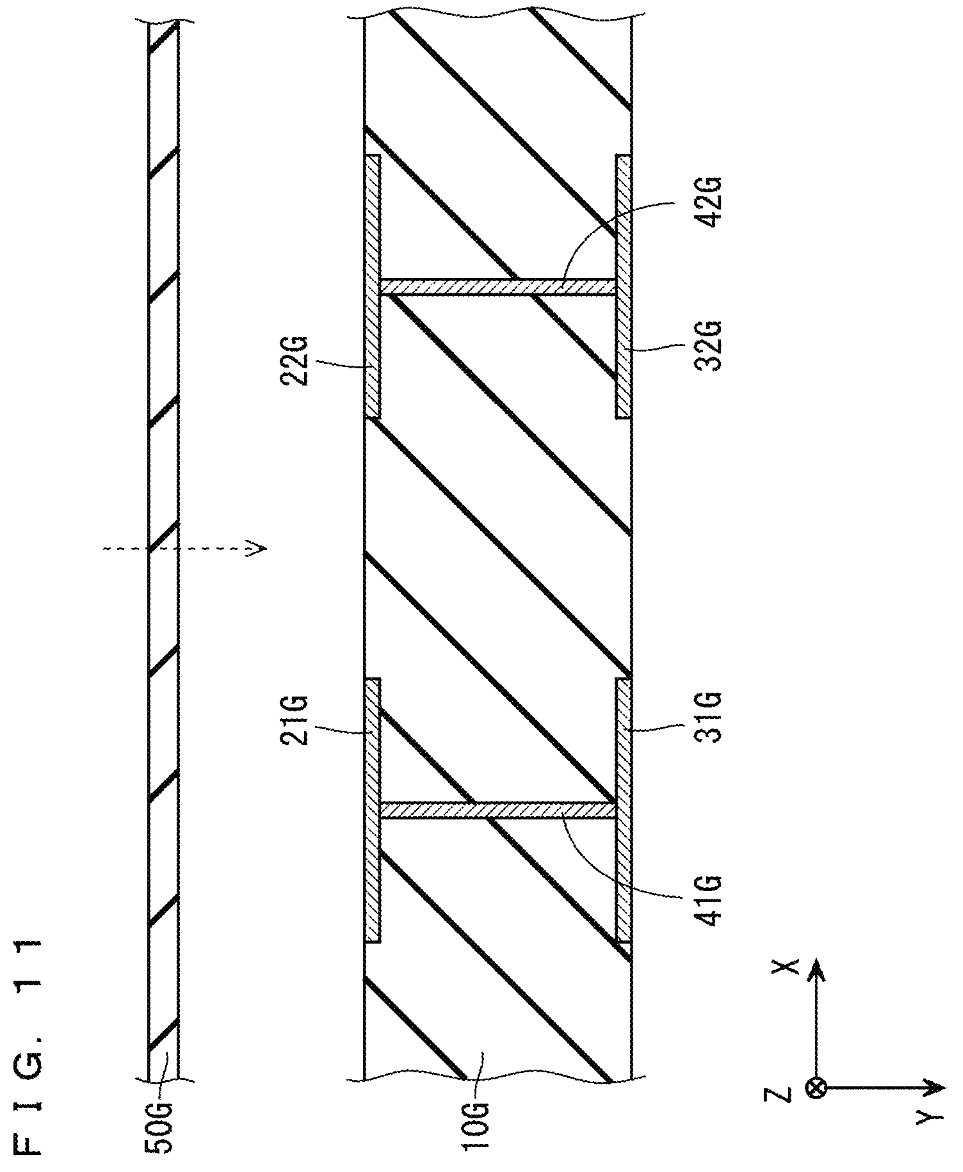
F I G. 1 1
50G
10G
21G
22G
31G
32G
41G
42G
X
Y
Z

F I G. 1 4
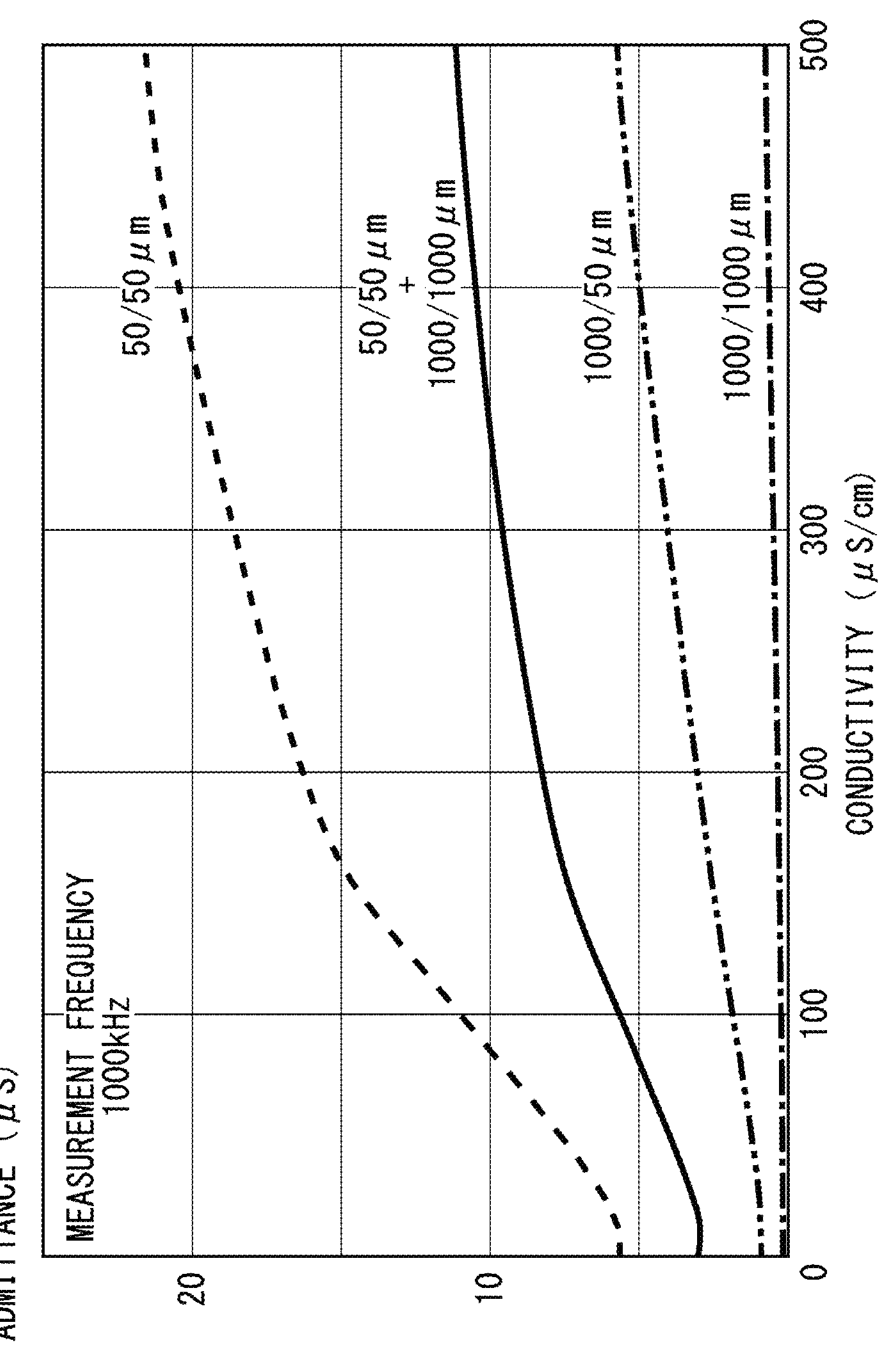

FIG. 15
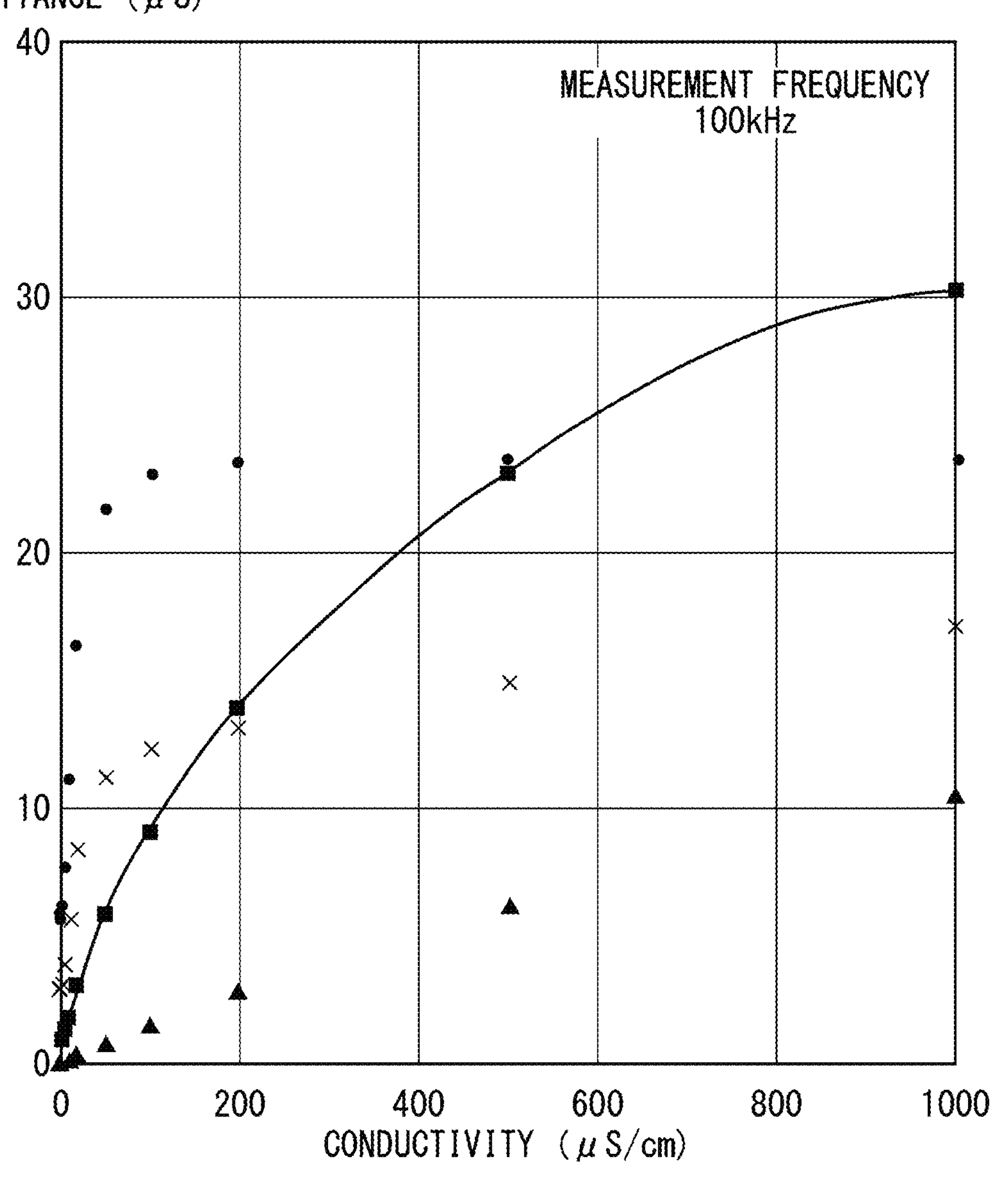
ADMITTANCE (μS)
MEASUREMENT FREQUENCY
100kHz
40
30
20
10
0
0
200
400
600
800
1000
CONDUCTIVITY (μS/cm)
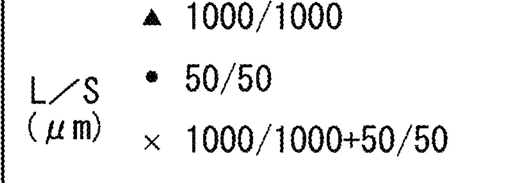
L/S
(μm)
1000/1000
50/50
1000/1000+50/50
1000/50

METHOD OF MEASURING A CONDUCTIVITY OF A LIQUID USING A CONDUCTIVITY SENSOR

CROSS-REFERENCE TO RELATED APPLICATION

This application is a continuation application of PCT/JP2023/003755, filed on Feb. 6, 2023, which claims the benefit of priority of International Patent Application No. PCT/JP2022/004628, filed on Feb. 7, 2022, the entire contents of which are incorporated herein by reference.

BACKGROUND OF THE INVENTION

Field of the Invention

The present invention relates to a conductivity measurement method and, in particular, to a method of measuring a conductivity of a liquid using a conductivity sensor.

Description of the Background Art

WO 2021/241628 discloses a capacitive sensor. The sensor includes an insulating layer, a first detection electrode, a second detection electrode, and a protective layer. The first detection electrode is provided on the insulating layer. The second detection electrode is provided on the insulating layer away from the first detection electrode and forms a capacitance together with the first detection electrode. The protective layer covers the first detection electrode and the second detection electrode, has a thickness d satisfying 1 μm≤d≤10 μm, and is formed of zirconia or alumina.

Japanese Patent Application Laid-Open No. 2019-109224 discloses a small-sized conductivity sensor intended to be capable of measuring a range of a wide conductivity of a liquid even in a case where a measurement region is small. The conductivity sensor includes a first electrode and a second electrode each having a surface area deciding a cell constant of the sensor. At least one of the electrodes is provided with a switching means disposed so that the surface area of each electrode can be changed, thereby varying the cell constant of the sensor. For example, the first electrode and the second electrode include a plurality of electrode fingers.

WO 2021/241628 is hereinafter also referred to as Patent Document 1. Japanese Patent Application Laid-Open No. 2019-109224 is hereinafter also referred to as Patent Document 2.

A method of measuring a conductivity of a liquid with sufficient sensitivity over a wide conductivity range using a sensor having a configuration as in Patent Document 1 described above has not sufficiently been studied so far. For example, it is considered that technology in Patent Document 2 described above does not assume formation of a protective layer as disclosed in Patent Document 1. This is because, while formation of the protective layer leads to formation of a capacitance between an electrode and a liquid, an increase in impedance of the electrode due to the influence of the capacitance at an interface between the electrode and the liquid is considered problematic in securing a wide conductivity measurement range of the liquid according to Patent Document 2. Furthermore, Patent Document 2 described above only discloses, as a means for avoiding a chemical interaction between the electrode and the liquid, the use of an inert conductive material as an electrode material and is silent on application of the protective layer as the means. This is presumably because addition of the protective layer leading to the increase in impedance is not assumed in the technology in the Patent Document 2.

SUMMARY

The present invention has been conceived to solve a problem as described above, and it is an object of the present invention to provide a conductivity measurement method enabling measurement of a conductivity of a liquid with sufficient sensitivity over a wide conductivity range.

A first aspect is a conductivity measurement method of measuring a conductivity of a liquid using a conductivity sensor including an insulating layer, a first detection electrode provided on the insulating layer, a second detection electrode provided on the insulating layer away from the first detection electrode, and a protective layer covering the first detection electrode and the second detection electrode and formed of an insulator, the conductivity measurement method including:

a) measuring a first complex impedance between the first detection electrode and the second detection electrode at a first frequency with the liquid being in contact with the protective layer to face each of the first detection electrode and the second detection electrode through the protective layer;

b) extracting a first extraction value from the first complex impedance according to a predetermined extraction rule;

c) determining whether the first extraction value is within a predetermined tolerance;

d) deciding the conductivity of the liquid based on the first extraction value when it is determined that the first extraction value is within the tolerance in c); and e) deciding the conductivity of the liquid based on a second extraction value when it is determined that the first extraction value is outside the tolerance in c), the second extraction value being extracted according to the extraction rule from a second complex impedance between the first detection electrode and the second detection electrode at a second frequency different from the first frequency with the liquid being in contact with the protective layer to face each of the first detection electrode and the second detection electrode through the protective layer.

A second aspect is the conductivity measurement method according to the first aspect, wherein the extraction rule corresponds to extraction of a reactive component from a complex impedance.

A third aspect is the conductivity measurement method according to the first aspect, wherein the extraction rule corresponds to extraction of an absolute value of an admittance from a complex impedance.

A fourth aspect is the conductivity measurement method according to the second or the third aspect, wherein when the first extraction value is greater than the tolerance in c), the second frequency is higher than the first frequency in e).

A fifth aspect is the conductivity measurement method according to any one of the second to the fourth aspects, wherein when the first extraction value is smaller than the tolerance in c), the second frequency is lower than the first frequency in e).

A sixth aspect is the conductivity measurement method according to the first aspect, wherein the extraction rule corresponds to extraction of an absolute value of an impedance from a complex impedance.

A seventh aspect is the conductivity measurement method according to the sixth aspect, wherein when the first extraction value is greater than the tolerance in c), the second frequency is lower than the first frequency in e).

An eighth aspect is the conductivity measurement method according to the sixth or the seventh aspect, wherein when the first extraction value is smaller than the tolerance in c), the second frequency is higher than the first frequency in e).

A ninth aspect is the conductivity measurement method according to any one of the first to the eighth aspects, where e) includes e1) measuring the second complex impedance only when it is determined that the first extraction value is outside the tolerance in c).

A tenth aspect is the conductivity measurement method according to any one of the first to the eighth aspects, further including f) before c), measuring the second complex impedance.

An eleventh aspect is the conductivity measurement method according to any one of the first to the tenth aspects, wherein the first detection electrode and the second detection electrode are interdigitated in the conductivity sensor to form a line and space pattern having a line width and a space width, the space width being 200 μm or less.

A twelfth aspect is the conductivity measurement method according to any one of the first to the tenth aspects, wherein the first detection electrode and the second detection electrode are interdigitated in the conductivity sensor to form a line and space pattern having a line width and a space width, the line width being 500 μm or more.

A thirteenth aspect is the conductivity measurement method according to any one of the first to the tenth aspects, wherein the first detection electrode and the second detection electrode are interdigitated in the conductivity sensor to form a line and space pattern having a line width and a space width, the space width being 200 μm or less, the line width being 500 μm or more.

A fourteenth aspect is the conductivity measurement method according to any one of the eleventh to the thirteenth aspects, wherein at least one of the first frequency and the second frequency is a frequency on the order of 100 kHz.

A fifteenth aspect is the conductivity measurement method according to any one of the first to the tenth aspects, wherein the first detection electrode and the second detection electrode are interdigitated in the conductivity sensor to form a first line and space pattern having a first space width and a second line and space pattern having a second space width different from the first space width.

A sixteenth aspect is the conductivity measurement method according to the fifteenth aspect, wherein the first space width is 100 μm or less, and the second space width is more than 100 μm.

A seventeenth aspect is the conductivity measurement method according to the fifteenth or the sixteenth aspect, wherein the second space width is 10 times or more and 70 times or less the first space width.

An eighteenth aspect is the conductivity measurement method according to any one of the fifteenth to the seventeenth aspects, wherein the first line and space pattern and the second line and space pattern share a single line to be adjacent to each other.

A nineteenth aspect is the conductivity measurement method according to any one of the first to the eighteenth aspects, wherein the protective layer is formed of zirconia or alumina and has a thickness of 1 μm or more and 10 μm or less.

A twentieth aspect is the conductivity measurement method according to any one of the first to the nineteenth aspects, wherein the protective layer is formed of a sintered body.

According to one embodiment, the conductivity of the liquid is decided based on the first extraction value from the first complex impedance between the first detection electrode and the second detection electrode at the first frequency when it is determined that the first extraction value is within the tolerance, and the conductivity of the liquid is decided based on the second extraction value from the second complex impedance at the second frequency when it is determined that the first extraction value from the first complex impedance between the first detection electrode and the second detection electrode at the first frequency is outside the tolerance. Sufficient sensitivity of the extraction value to the conductivity of the liquid can thereby be secured over a wide conductivity range. The conductivity of the liquid can thus be measured with sufficient sensitivity over a wide conductivity range.

e) may include e1) measuring the second complex impedance only when it is determined that the first extraction value is outside the tolerance in c). Measurement of the second complex impedance can thereby be omitted when it is unnecessary.

The conductivity measurement method may further include f) before c), measuring the second complex impedance. This eliminates the need for measurement of the second complex impedance after c).

The first detection electrode and the second detection electrode may be interdigitated in the conductivity sensor to form the line and space pattern having the line width and the space width, and the space width may be 200 μm or less. A range of a detectable conductivity is thereby easily secured to a lower value.

The first detection electrode and the second detection electrode may be interdigitated in the conductivity sensor to form the line and space pattern having the line width and the space width, and the line width may be 500 μm or more. The range of the detectable conductivity is thereby easily secured to a higher value.

The first detection electrode and the second detection electrode may be interdigitated in the conductivity sensor to form the line and space pattern having the line width and the space width, the space width may be 200 μm or less, and the line width may be 500 μm or more. A wide range of the detectable conductivity is thereby easily secured from a lower value to a higher value. This effect is easily more sufficiently obtained when at least one of the first frequency and the second frequency is the frequency on the order of 100 KHz.

The first detection electrode and the second detection electrode may be interdigitated in the conductivity sensor to form the first line and space pattern having the first space width and the second line and space pattern having the second space width different from the first space width. Linearity of the extraction value over a wide conductivity range can thereby be increased. The range of the conductivity in which the conductivity of the liquid can be measured with sufficient sensitivity and sufficient linearity can thus be increased. The first space width may be 100 μm or less, and the second space width may be more than 100 μm. The second space width may be 10 times or more and 70 times or less the first space width. A plurality of lines of the first line and space pattern may each have a line length of 1 mm or more, and a plurality of lines of the second line and space pattern may each have a line length of 1 mm or more.

The first line and space pattern and the second line and space pattern may each include a plurality of spaces. The first line and space pattern and the second line and space pattern may share a single line to be adjacent to each other.

The protective layer may be formed of zirconia or alumina and have a thickness of 1 μm or more and 10 μm or less. A capacitance formed by the protective layer between each of the first detection electrode and the second detection electrode and the liquid has a large influence on measurement of an impedance between the first detection electrode and the second detection electrode in this case, but, according to the above-mentioned embodiment, the conductivity of the liquid can be measured with sufficient sensitivity over a wide conductivity range even under the influence.

The protective layer may be formed of the sintered body. Reduction in manufacturing efficiency due to formation of a protective layer formed of a non-sintered body is thereby avoided in the manufacture of the conductivity sensor. The protective layer and the insulating layer are the sintered body as an integral structure, so that a failure originating from an interface between them is less likely to occur. Characteristics such as chemical resistance and thermal shock resistance are thereby improved.

These and other objects, features, aspects and advantages of the present invention will become more apparent from the following detailed description when taken in conjunction with the accompanying drawings.

BRIEF DESCRIPTION OF THE DRAWINGS

FIG. 3 is a schematic partial cross-sectional view taken along the line III-III of FIGS. 1 and 2.

FIG. 4 is a schematic partial cross-sectional view taken along the line IV-IV of FIGS. 1 and 2.

FIG. 5 is a schematic partial cross-sectional view illustrating a state of performing a conductivity measurement method in a view of FIG. 4.

FIG. 7 is a schematic front view illustrating a configuration of the conductivity sensor in the measurement system in FIG. 1 without illustration of a protective layer.

FIG. 8 is a graphical representation showing results of simulation of a relationship between a conductivity of a liquid and a capacitance value corresponding to a reactive component extracted from a complex impedance measured by the conductivity sensor at 100 kHz and at 1000 kHz.

FIG. 9 is an enlarged view of a portion of FIG. 8.

FIG. 11 is a partial cross-sectional view schematically showing one step in a method of manufacturing the conductivity sensor according to Embodiment 1.

FIG. 14 is a graphical representation showing results of simulation of a relationship between the conductivity of the liquid and an absolute value of an admittance extracted from the complex impedance measured by the conductivity sensor at 1000 kHz for different line and space pattern configurations.

FIG. 15 is a graphical representation showing results of simulation of a relationship between the conductivity of the liquid and an absolute value of an admittance extracted from the complex impedance measured by the conductivity sensor at 100 kHz for different line and space pattern configurations.

DESCRIPTION OF THE PREFERRED EMBODIMENTS

Embodiments of the present invention will be described below with reference to the drawings.

Embodiment 1

(Configuration)

Figure 1:
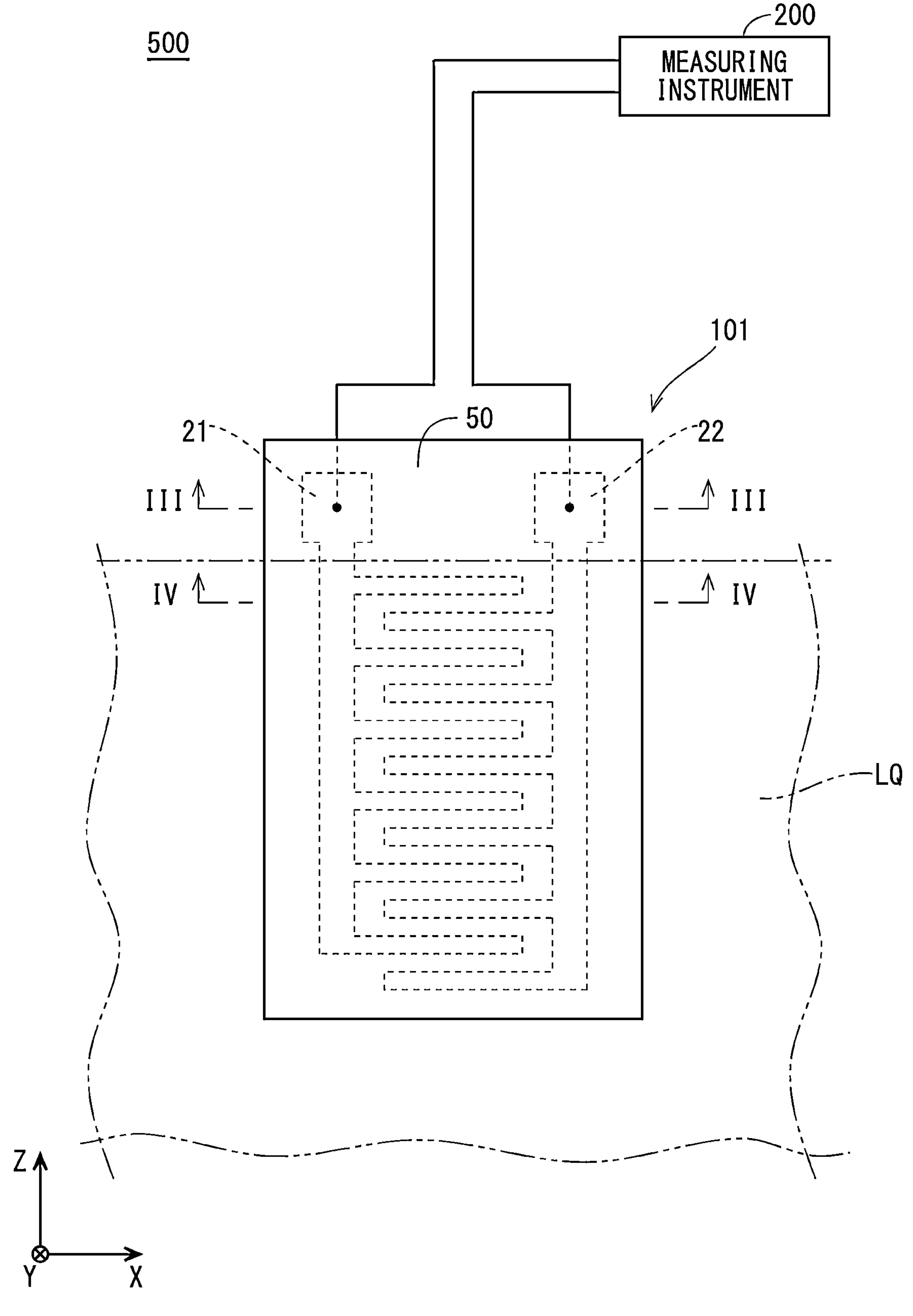
FIG. 1 is a front view schematically showing a configuration of a measurement system including a conductivity sensor according to Embodiment 1.
Figure 2:
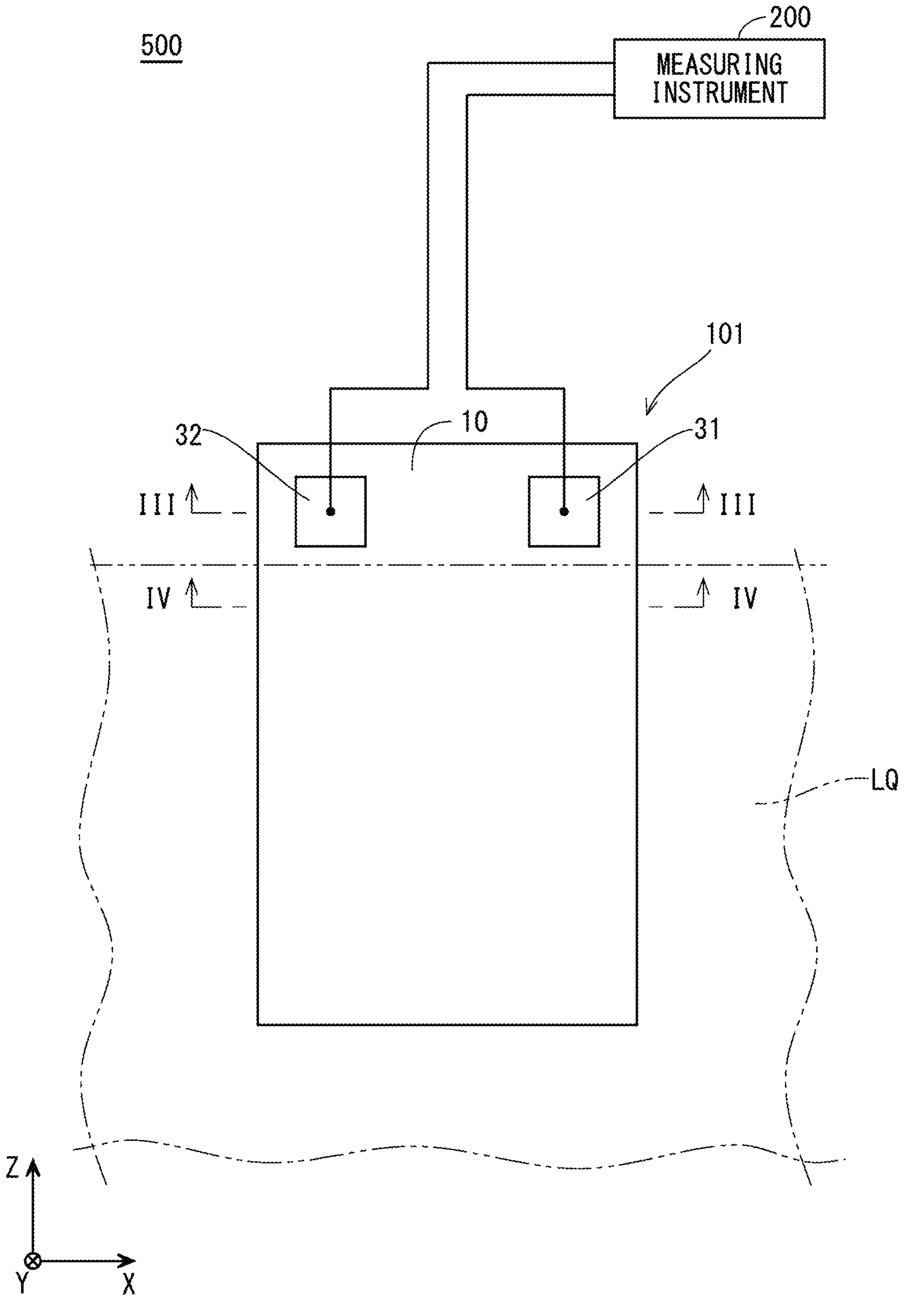
FIG. 2 is a schematic rear view of FIG. 1.
Figure 6:
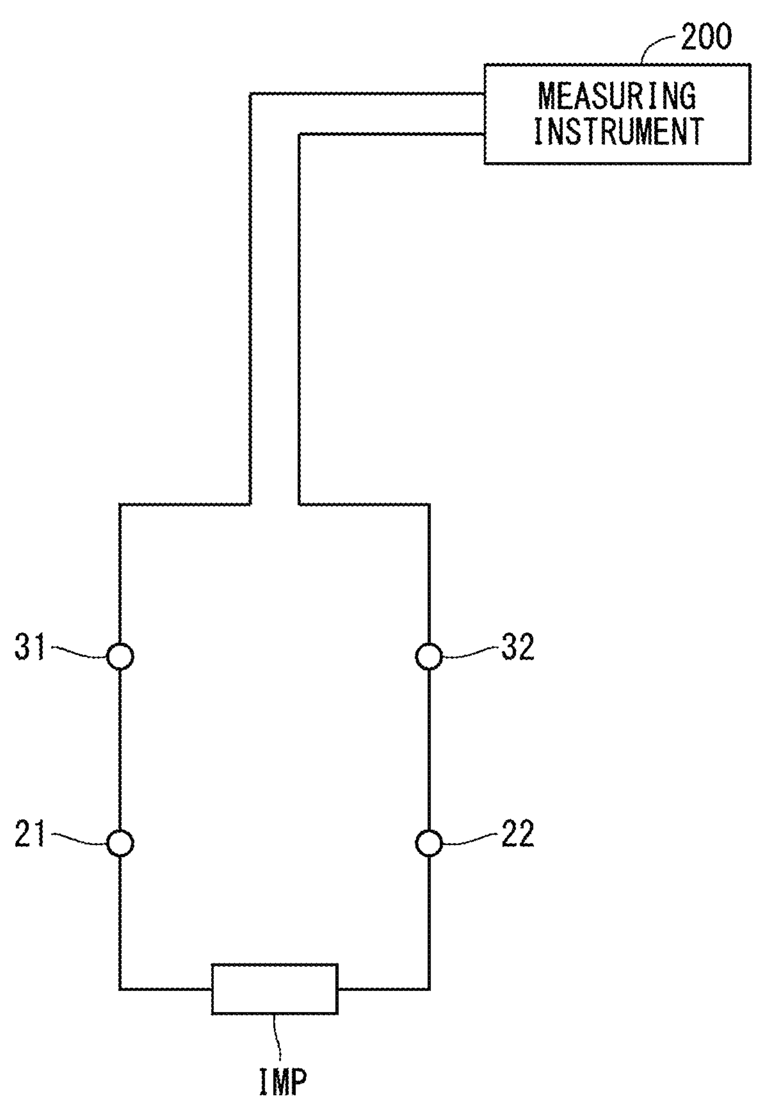
FIG. 6 is a circuit diagram showing an approximate equivalent circuit corresponding to FIG. 5.

FIGS. 1 and 2 are respectively a front view and a rear view schematically showing a configuration of a measurement system 500 including a conductivity sensor 101 according to the present embodiment. FIG. 3 is a schematic partial cross-sectional view taken along the line III-III of FIGS. 1 and 2. FIG. 4 is a schematic partial cross-sectional view taken along the line IV-IV of FIGS. 1 and 2. FIG. 5 is a schematic partial cross-sectional view illustrating a state of performing a conductivity measurement method in a view of FIG. 4. FIG. 6 is a circuit diagram showing an approximate equivalent circuit corresponding to FIG. 5. FIG. 7 is a schematic front view illustrating a configuration of the conductivity sensor 101 without illustration of a protective layer 50. In FIGS. 1 and 2, a liquid LQ whose conductivity is to be measured by the conductivity sensor 101 is shown in phantom lines. In FIG. 5, the liquid LQ is illustrated. An XYZ Cartesian coordinate system is shown in each of drawings to facilitate understanding of a directional relationship among the drawings. A Z direction corresponds to a vertically upward direction in the present embodiment.

The measurement system 500 includes the conductivity sensor 101 and a measuring instrument 200. The conductivity sensor 101 is a sensor to measure the conductivity of the liquid LQ. The conductivity sensor 101 includes an insulating layer 10, a first detection electrode 21, a second detection electrode 22, and the protective layer 50. The conductivity sensor 101 may further include a first pad electrode 31, a second pad electrode 32, a first via electrode 41, and a second via electrode 42. The conductivity sensor 101 includes, as a schematic configuration, an insulating substrate in which electrodes including the first detection electrode 21 and the second detection electrode 22 have been embedded. The insulating substrate includes the insulating layer 10 and the protective layer 50. The first pad electrode 31 and the second pad electrode 32 are provided in the conductivity sensor 101 for electrical connection from outside the conductivity sensor 101 to the embedded electrodes.

The insulating layer 10 is preferably formed of a ceramic insulator and is more preferably formed of the same material as the protective layer 50. The insulating layer 10 has a thickness of approximately 1 mm, for example.

The first detection electrode 21 is provided on one surface of the insulating layer 10 as illustrated in FIGS. 3 to 5. The second detection electrode 22 is provided on the one surface of the insulating layer 10 away from the first detection electrode 21. A minimum spacing between the first detection electrode 21 and the second detection electrode 22 is preferably 30 μm or more and 2000 μm or less and is more preferably 30 μm or more and 1000 μm or less.

The first detection electrode 21 and the second detection electrode 22 may be interdigitated in the conductivity sensor 101 to form a line and space (L/S) pattern PT as illustrated in FIG. 7. In an example illustrated in FIG. 7, the line and space pattern PT has a length along an X direction and a width along the Z direction. The line and space pattern PT preferably has a line length LL of 1 mm or more and 20 mm or less. The line and space pattern PT is formed by interdigitating at least one line L1 (e.g., a plurality of lines L1 as illustrated in FIG. 7) of the first detection electrode 21 and at least one line L2 (e.g., a plurality of lines L2 as illustrated in FIG. 7) of the second detection electrode 22. A minimum spacing between the line L1 and the line L2, that is, a space width WS (also referred to as an "S dimension") of the line and space pattern PT is preferably 30 μm or more and 2000 μm or less and is more preferably 30 μm or more and 1000 μm or less. A width of each of the line L1 and the line L2, that is, a line width WL (also referred to as an "L dimension") of the line and space pattern PT is preferably 30 μm or more and 2000 μm or less and is more preferably 30 μm or more and 1000 μm or less.

The first detection electrode 21 and the second detection electrode 22 are preferably formed of a refractory metal that is difficult to oxidize and are formed of platinum, tungsten, or cobalt, for example. The first detection electrode 21 and the second detection electrode 22 each have a thickness of approximately 5 μm, for example.

The protective layer 50 covers the first detection electrode 21 and the second detection electrode 22. Specifically, the protective layer 50 has a surface SF and a surface facing the first detection electrode 21 and the second detection electrode 22 opposite the surface SF. The protective layer 50 has a thickness d, and the thickness d preferably satisfies $1\ \mu m \le d \le 10\ \mu m$ and more preferably satisfies $1\ \mu m \le d \le 5\ \mu m$. The protective layer 50 is formed of an insulator. In particular, when the protective layer 50 is formed of zirconia or alumina, the conductivity sensor 101 has an enhanced corrosion resistance and an enhanced chemical resistance. The protective layer 50 has a relative permittivity ε, and $\varepsilon \ge 10$ is preferably satisfied. For example, & of approximately 30 can be obtained by using zirconia, and & of approximately 10 can be obtained by using alumina. Preferably, $\varepsilon/d \ge 1$ is satisfied. The protective layer 50 is preferably formed of a sintered body in terms of manufacturing efficiency, for example.

The protective layer 50 illustrated in each of FIGS. 1 and 3 to 5 is a single layer continuously covering both the first detection electrode 21 and the second detection electrode 22 and does not have any particular pattern. In this case, a shape of the protective layer 50 can be simplified. On the other hand, when a more complex shape of the protective layer is allowed, the protective layer may have any pattern as a modification. This pattern may have a first portion and a second portion spaced apart from each other, and the first portion may cover the first detection electrode 21 and the second portion may cover the second detection electrode 22. In this case, the first portion and the second portion of the protective layer 50 are separated by a region where the protective layer 50 is not provided.

The first pad electrode 31 is provided on a surface opposite the above-mentioned one surface of the insulating layer 10. The second pad electrode 32 is provided on the surface opposite the above-mentioned one surface of the insulating layer 10 away from the first pad electrode 31. The first via electrode 41 extends through the insulating layer 10 and has one end connected to the first detection electrode 21 and the other end connected to the first pad electrode 31. The second via electrode 42 extends through the insulating layer 10 and has one end connected to the second detection electrode 22 and the other end connected to the second pad electrode 32.

The measuring instrument 200 has a function to measure a complex impedance and a function to extract an extraction value from the complex impedance according to a predetermined extraction rule. The measuring instrument 200 may be a typical impedance analyzer but may be a measuring instrument having a configuration obtained by further simplifying a measurement method described below in a feasible range. The extraction rule may correspond to extraction of a reactive component, an absolute value of an admittance, or an absolute value of an impedance from the complex impedance.

The measuring instrument 200 is electrically connected to the first pad electrode 31 and the second pad electrode 32. With reference to the equivalent circuit in FIG. 6, a complex impedance IMP is herein a complex impedance between the first detection electrode 21 and the second detection electrode 22 in a state illustrated in FIG. 5. In the state illustrated in FIG. 5, the liquid LQ is in contact with the protective layer 50 to face each of the first detection electrode 21 and the second detection electrode 22 through the protective layer 50. The influence of a complex impedance of the first pad electrode 31, the first detection electrode 21, and the first via electrode 41 between them and a complex impedance of the second pad electrode 32, the second detection electrode 22, and the second via electrode 42 between them on the complex impedance IMP is almost negligible. A complex impedance to be measured by the measuring instrument 200 is thus substantially the complex impedance IMP (FIG. 6) between the first detection electrode 21 and the second detection electrode 22.

The complex impedance generally has a resistive component and the reactive component. In the configuration according to the present embodiment, the reactive component is mainly attributable to a capacitance value formed by the protective layer 50 and the liquid LQ arranged in an electrical path between the first detection electrode 21 and the second detection electrode 22. The reactive component is thus hereinafter also referred to as the capacitance value.

FIG. 8 is a graphical representation showing results of simulation of a relationship between the conductivity of the liquid LQ and the capacitance value corresponding to the reactive component extracted from the complex impedance measured by the conductivity sensor 101 at 100 kHz and at 1000 kHz. This simulation is for the conductivity sensor 101 having the line and space pattern PT having a line width WL of 50 μm and a space width WS of 50 μm. FIG. 9 is an enlarged view of a portion of FIG. 8. As is seen from these graphs, sensitivity of the capacitance value to the conductivity of the liquid LQ is better in a conductivity range of 1 μS/cm to 200 μS/cm at a frequency of 100 kHz and is better in a conductivity range of 10 μS/cm to 800 μS/cm at a frequency of 1000 KHz.

Table 1 and Table 2 below show results of simulation of a detectable conductivity when the reactive component (substantially the capacitance value) is extracted from the complex impedance under various conditions.

TABLE 1

| L/S | MEASUREMENT | DETECTABLE CONDUCTIVITY (μS/cm) | |
|---|---|---|---|
| (μm) | FREQUENCY (kHz) | MINIMUM | MAXIMUM |
| 50/50 | 1 | 0.01 | 10 |
| | 10 | 0.01 | 50 |
| | 100 | 0.1 | 200 |
| | 1000 | 10 | 700 |
| 100/100 | 1 | 0.01 | 10 |
| | 10 | 0.01 | 60 |
| | 100 | 0.5 | 300 |
| | 1000 | 50 | 1000 |
| 200/200 | 1 | 0.01 | 20 |
| | 10 | 0.01 | 100 |
| | 100 | 2 | 500 |
| | 1000 | 200 | 2000 |
| 500/500 | 1 | 0.01 | 60 |
| | 10 | 0.2 | 200 |
| | 100 | 20 | 1000 |
| | 1000 | — | — |
| 1000/1000 | 1 | 0.01 | 100 |
| | 10 | 1 | 600 |
| | 100 | 500 | 1000 |
| | 1000 | — | — |

TABLE 2

| L/S | MEASUREMENT | DETECTABLE CONDUCTIVITY (μS/cm) | |
|---|---|---|---|
| (μm) | FREQUENCY (kHz) | MINIMUM | MAXIMUM |
| 1000/50 | 1 | 0.01 | 100 |
| | 10 | 0.01 | 500 |
| | 100 | 2 | 2000 |
| | 1000 | — | — |
| 1000/100 | 1 | 0.01 | 100 |
| | 10 | 0.01 | 500 |
| | 100 | 2 | 2000 |
| | 1000 | — | — |
| 500/50 | 1 | 0.01 | 50 |
| | 10 | 0.01 | 200 |
| | 100 | 1 | 900 |
| | 1000 | 100 | 2000 |
| 500/100 | 1 | 0.01 | 50 |
| | 10 | 0.01 | 200 |
| | 100 | 2 | 1000 |
| | 1000 | 200 | 2000 |

In the present specification, a range indicated as "DETECTABLE CONDUCTIVITY" is a range of a conductivity [in μS/cm] in which the slope of the extraction value with respect to the conductivity (i.e., the derivative of the extraction value with respect to the conductivity) is a reference value or more. When the extraction value is the absolute value of the admittance [in S] or an inverse of the resistive component [in S], the reference value is $10^{-10}$, $10^{-9}$, $10^{-8}$, and $10^{-7}$ [in S/(μS/cm)] respectively at frequencies of 1 kHz, 10 kHz, 100 kHz, and 1000 kHz. When the extraction value is the capacitance value [in F], the reference value is $10^{-14}$ [in F/(μS/cm)] at each of the frequencies of 1 kHz, kHz, 100 kHz, and 1000 kHz. The "DETECTABLE CONDUCTIVITY" is dependent on the frequency as described above when the extraction value is the absolute value of the admittance [in S] or the inverse of the resistive component [in S] because, in this case, measurement variations are heavily dependent on the frequency, so that the reference value is reasonably set in view of the dependence. In Table 1 and Table 2 shown above and the other tables shown below, a sign "-" indicates that a range of the detectable conductivity is not found in a simulation range.

For example, the above-mentioned change in extraction value relative to a change in conductivity tends to decrease with increasing dimension L or measurement frequency, and excessive progression of this trend makes detection of the conductivity, that is, calculation of the conductivity with sufficient accuracy difficult.

A pair of values shown as "L/S" indicates a pair of the line width WL and the space width WS of the line and space pattern PT. Each of the line width WL and the space width WS may be 50 μm or more and 1000 μm or less as shown in Table 1 and Table 2 above but is not limited to 50 μm or more and 1000 μm or less. The line width WL and the space width WS are the same in Table 1 shown above and are different in Table 2 shown above.

In the results in Table 1 and Table 2 shown above, the detectable conductivity tends to shift to a higher conductivity range as the frequency increases.

Figure 10:
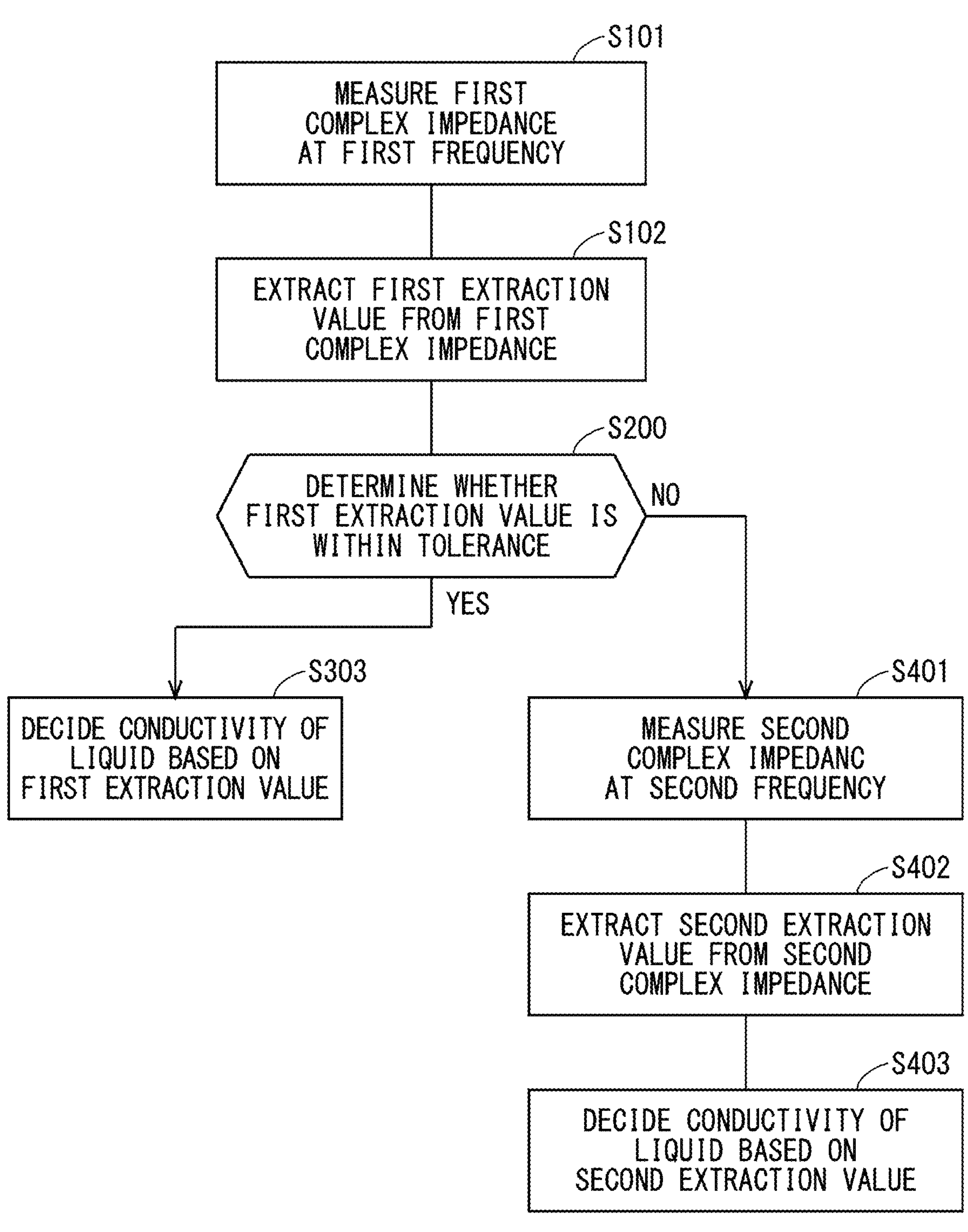
FIG. 10 is a schematic flowchart of the conductivity measurement method according to Embodiment 1.

FIG. 10 is a schematic flowchart of the conductivity measurement method of measuring the conductivity of the liquid LQ using the conductivity sensor 101.

In step S101, a first complex impedance between the first detection electrode 21 and the second detection electrode 22 at a first frequency is measured in the state in FIG. 5. In the state illustrated in FIG. 5, the liquid LQ is in contact with the protective layer 50 to face each of the first detection electrode 21 and the second detection electrode 22 through the protective layer 50 as described above. This measurement may be performed by a complex impedance measurement unit (not shown) of the measuring instrument 200. The complex impedance measurement unit has a function to measure the complex impedance at the first frequency and at a second frequency, which will be described below. The function to measure the complex impedance is, in other words, a function to apply an AC signal at the above-mentioned frequency to a measurement target and measure a ratio and a phase difference between a voltage and a current of the AC signal.

In step S102, a first extraction value is extracted from the first complex impedance according to the predetermined extraction rule. This extraction may be performed by an extraction unit (not shown) of the measuring instrument 200. The extracted first extraction value may be stored in a storage (not shown) of the measuring instrument 200.

In step S200, whether the first extraction value is within a predetermined tolerance is determined. This determination may be made by a determination unit (not shown) of the measuring instrument 200. The tolerance may be decided by examining a range in which sensitivity of the extraction value to the conductivity of the liquid LQ is sufficiently high in advance. In determination processing in step S200, a provisional conductivity of the liquid LQ decided from the first extraction value may be used. In this case, the above-mentioned range of the detectable conductivity may be used as the tolerance. In other words, determination processing may be performed by determining whether the provisional conductivity is within the range of the detectable conductivity. Also in this case, a definitive (not provisional) conductivity is decided in a step below.

When it is determined that the first extraction value is within the tolerance in step S200, the conductivity of the liquid LQ is decided based on the first extraction value in step S303. This decision may be made based on a correspondence between the extraction value and the conductivity examined in advance. This correspondence may experimentally be set, for example. This decision may be made by a decision unit (not shown) of the measuring instrument 200.

When it is determined that the first extraction value is outside the tolerance in step S200, the conductivity of the liquid LQ is decided based on a second extraction value extracted according to the above-mentioned extraction rule from a second complex impedance between the first detection electrode 21 and the second detection electrode 22 at the second frequency in the state illustrated in FIG. 5 in steps S401 to S403. The second frequency is herein different from the first frequency.

Specifically, in step S401 above, the second complex impedance between the first detection electrode 21 and the second detection electrode 22 at the second frequency is measured first in the state in FIG. 5. In the present embodiment, the second complex impedance is measured only when it is determined that the first extraction value is outside the tolerance in step S200. Thus, in the measuring instrument 200, the determination unit causes the complex impedance measurement unit to start measurement in step S401 in the present embodiment.

In step S402 above, the second extraction value is extracted from the second complex impedance according to the above-mentioned extraction rule. This extraction may be performed by the above-mentioned extraction unit of the measuring instrument 200.

In step S403 above, the conductivity of the liquid LQ is decided based on the second extraction value. This decision may be performed by the above-mentioned decision unit of the measuring instrument 200.

The conductivity of the liquid LQ is thereby decided.

The storage, the determination unit, and the decision unit described above may be achieved by a control apparatus (not shown). The control apparatus may include a general computer including an electric circuit. The general computer includes a central processing unit (CPU), read only memory (ROM), random access memory (RAM), a storage apparatus, an input unit, a display unit, a communication unit, and a bus line mutually connecting them.

While a method of using two frequencies, namely, the first frequency and the second frequency has been described in the present embodiment, more than two frequencies may be used as appropriate as a modification. In this case, whether the second extraction value extracted in step S402 is within a predetermined tolerance for the second extraction value is determined, and, based on a result of determination, measurement of a third complex impedance at a third frequency, subsequent extraction of a third extraction value, and the like are performed. The conductivity of the liquid LQ can thereby be decided using the optimum one of the more than two frequencies.

Next, a relationship between the first frequency and the second frequency will be described below.

In a case where the extraction rule corresponds to extraction of the reactive component (capacitance value) from the complex impedance, when the first extraction value is greater than the tolerance in step S200, the second frequency may be higher than the first frequency in step S401. When the first extraction value is smaller than the tolerance in step S200, the second frequency may be lower than the first frequency in step S401.

In a case where the extraction rule corresponds to extraction of the absolute value of the admittance from the complex impedance, when the first extraction value is greater than the tolerance in step S200, the second frequency may be higher than the first frequency in step S401. When the first extraction value is smaller than the tolerance in step S200, the second frequency may be lower than the first frequency in step S401. As for results of simulation of a minimum value and a maximum value of the detectable conductivity in a case where the absolute value of the admittance is used as the extraction value, Table 3 and Table 4 below show typical results, and Table 5 below shows results when a parameter is systematically changed.

TABLE 3

| L/S | MEASUREMENT | DETECTABLE CONDUCTIVITY (μS/cm) | |
|---|---|---|---|
| (μm) | FREQUENCY (kHz) | MINIMUM | MAXIMUM |
| 50/50 | 1 | 0.01 | 7 |
| | 10 | 0.01 | 30 |
| | 100 | 0.1 | 100 |
| | 1000 | 6 | 600 |
| 100/100 | 1 | 0.01 | 10 |
| | 10 | 0.01 | 50 |
| | 100 | 0.2 | 200 |
| | 1000 | 20 | 700 |
| 200/200 | 1 | 0.01 | 10 |
| | 10 | 0.01 | 80 |
| | 100 | 0.3 | 300 |
| | 1000 | 30 | 1000 |
| 500/500 | 1 | 0.01 | 50 |
| | 10 | 0.01 | 80 |
| | 100 | 1 | 600 |
| | 1000 | — | — |
| 1000/1000 | 1 | 0.01 | 100 |
| | 10 | 0.01 | 500 |
| | 100 | 5 | 1000 |
| | 1000 | — | — |

TABLE 4

| L/S | MEASUREMENT | DETECTABLE CONDUCTIVITY (μS/cm) | |
|---|---|---|---|
| (μm) | FREQUENCY (kHz) | MINIMUM | MAXIMUM |
| 1000/50 | 1 | 0.01 | 70 |
| | 10 | 0.01 | 300 |
| | 100 | 0.5 | 1000 |
| | 1000 | 40 | 500 |
| 1000/100 | 1 | 0.01 | 80 |
| | 10 | 0.01 | 400 |
| | 100 | 0.5 | 1000 |
| | 1000 | 100 | 200 |
| 500/50 | 1 | 0.01 | 30 |
| | 10 | 0.01 | 100 |
| | 100 | 0.1 | 600 |
| | 1000 | 20 | 1000 |
| 500/100 | 1 | 0.01 | 30 |
| | 10 | 0.01 | 100 |
| | 100 | 0.3 | 600 |
| | 1000 | 40 | 1000 |

TABLE 5

| MEASUREMENT FREQUENCY (kHz) | S (μm) | L (μm) 100 DETECTABLE MINIMUM (μS/cm) | L (μm) 100 CONDUCTIVITY MAXIMUM (μS/cm) | L (μm) 500 DETECTABLE MINIMUM (μS/cm) | L (μm) 500 CONDUCTIVITY MAXIMUM (μS/cm) | L (μm) 1000 DETECTABLE MINIMUM (μS/cm) |
|---|---|---|---|---|---|---|
| 1 | 50 | 0.01 | 10 | 0.01 | 30 | 0.01 |
| | 100 | 0.01 | 10 | 0.01 | 30 | 0.01 |
| | 200 | 0.01 | 10 | 0.01 | 40 | 0.01 |
| | 500 | 0.01 | 10 | 0.01 | 50 | 0.01 |
| 10 | 50 | 0.01 | 50 | 0.01 | 100 | 0.01 |
| | 100 | 0.01 | 50 | 0.01 | 100 | 0.01 |
| | 200 | 0.01 | 50 | 0.01 | 100 | 0.01 |
| | 500 | 0.01 | 50 | 0.01 | 80 | 0.01 |
| 100 | 50 | 0.1 | 200 | 0.1 | 600 | 0.5 |
| | 100 | 0.2 | 200 | 0.3 | 600 | 0.5 |
| | 200 | 0.3 | 200 | 0.5 | 600 | 1 |
| | 500 | 1 | 200 | 1 | 600 | 2 |
| 1000 | 50 | 10 | 800 | 20 | 1000 | 40 |
| | 100 | 20 | 700 | 40 | 1000 | 100 |
| | 200 | 30 | 700 | 80 | 1000 | — |
| | 500 | — | — | — | — | — |

| MEASUREMENT FREQUENCY (kHz) | S (μm) | L (μm) 1000 CONDUCTIVITY MAXIMUM (μS/cm) | L (μm) 2000 DETECTABLE MINIMUM (μS/cm) | L (μm) 2000 CONDUCTIVITY MAXIMUM (μS/cm) |
|---|---|---|---|---|
| 1 | 50 | 70 | 0.01 | 100 |
| | 100 | 80 | 0.01 | 100 |
| | 200 | 90 | 0.01 | 100 |
| | 500 | 90 | 0.01 | 200 |
| 10 | 50 | 300 | 0.01 | 700 |
| | 100 | 400 | 0.01 | 700 |
| | 200 | 400 | 0.01 | 700 |
| | 500 | 400 | 0.01 | 700 |
| 100 | 50 | 1000 | 1 | 1000 |
| | 100 | 1000 | 1 | 1000 |
| | 200 | 1000 | 2 | 1000 |
| | 500 | 1000 | 4 | 1000 |
| 1000 | 50 | 500 | — | — |
| | 100 | 200 | — | — |
| | 200 | — | — | — |
| | 500 | — | — | — |

In a case where the extraction rule corresponds to extraction of the absolute value of the impedance from the complex impedance, when the first extraction value is greater than the tolerance in step S200, the second frequency may be lower than the first frequency in step S401. When the first extraction value is smaller than the tolerance in step S200, the second frequency may be higher than the first frequency in step S401. The results of simulation when the absolute value of the admittance is used as the extraction value have already been shown in Table 3 to Table 5 above, so that description on the results of simulation when the absolute value of the impedance corresponding to an inverse of the absolute value of the admittance is used as the extraction value is omitted.

(Manufacturing Method)

FIG. 11 is a partial cross-sectional view schematically showing one step in a method of manufacturing the conductivity sensor 101 according to the present embodiment.

With reference to FIGS. 3 and 11, a stack including a green sheet 10G to be the insulating layer 10, a paste layer 21G to be the first detection electrode 21, a paste layer 22G to be the second detection electrode 22, a paste layer 31G to be the first pad electrode 31, a paste layer 32G to be the second pad electrode 32, a paste layer 41G to be the first via electrode 41, and a paste layer 42G to be the second via electrode 42 is prepared. Each paste layer can be formed by printing a paste including metal powder and ceramic powder onto the green sheet 10G. The green sheet 10G may include a single layer or may include a plurality of stacked green sheets.

A green sheet 50G to be the protective layer 50 is bonded to the above-mentioned stack under pressure as shown by an arrow (FIG. 11). This bonding under pressure is preferably performed with heating.

The stack to which the green sheet 50G has been bonded under pressure as described above is fired next. The conductivity sensor 101 is thereby obtained. The protective layer 50 is thus formed of the sintered body in this case.

(Effects)

According to the present embodiment, the conductivity of the liquid LQ is decided based on the first extraction value in step S303 when it is determined that the first extraction value is within the tolerance in step S200 (FIG. 10), and the conductivity of the liquid LQ is decided based on the second extraction value from the second complex impedance at the second frequency in steps S401 to S403 when it is determined that the first extraction value is outside the tolerance in step S200 (FIG. 10). Sufficient sensitivity of the extraction value to the conductivity of the liquid LQ can thereby be secured over a wide conductivity range. The conductivity of the liquid LQ can thus be measured with sufficient sensitivity over a wide conductivity range.

Step S401 is performed only when it is determined that the first extraction value is outside the tolerance in step S200 in the present embodiment. Step S401 can thereby be omitted when it is unnecessary.

The space width WS of the line and space pattern PT (FIG. 7) is preferably 200 μm or less and is more preferably 100 μm or less. The range of the detectable conductivity is thereby easily secured to a lower value. In terms of manufacturability of the detection electrodes, the space width WS is preferably 30 μm or more and is more preferably 50 μm or more.

The line width WL of the line and space pattern PT (FIG. 7) is preferably 500 μm or more and is more preferably 1000 μm or more. The range of the detectable conductivity is thereby easily secured to a higher value. In terms of miniaturization of the detection electrodes, the line width WL is preferably 2000 μm or less and is more preferably 1000 μm or less. As long as an upper limit of the measured conductivity is approximately 1000 μS/cm, there is a less need for the line width WL to be excessively increased to be greater than the values described herein.

It is more preferable to satisfy the above-mentioned conditions for both the space width WS and the line width WL. A wide range of the detectable conductivity is thereby easily secured from a lower value to a higher value. This effect is easily more sufficiently obtained when the measurement frequency (i.e., at least one of the first frequency and the second frequency) is a frequency on the order of 100 kHz. The frequency on the order of 100 kHz is, in other words, a frequency between a frequency on the order of 10 kHz, which is one order of magnitude less than 100 kHz, and a frequency on the order of 1000 kHz, which is one order of magnitude more than 100 kHz, and naturally includes a frequency of approximately 100 kHz (e.g., a frequency of 100 kHz±10%). The same applies to frequencies on the order of other values.

The line length LL (FIG. 7) of the line and space pattern PT is preferably 1 mm or more and 20 mm or less. The line length LL of 1 mm or more can enhance sensitivity of the conductivity sensor 101. The line length LL of 20 mm or less can suppress a probability of a failure due to adhesion of foreign matter onto the line and space pattern PT. The line length LL of 20 mm or less also avoids an excessive increase in size of the conductivity sensor 101.

The space width WS is preferably 30 μm or more and 2000 μm or less and is more preferably 30 μm or more and 1000 μm or less. The space width WS of 30 μm or more allows for easy management of the space width WS with general multilayer ceramic technology. The space width WS of 2000 μm or less (more preferably 1000 μm or less) avoids extremely low electrical coupling between the first detection electrode 21 and the second detection electrode 22 through the liquid LQ, so that extremely low sensitivity of the conductivity sensor 101 is easily avoided.

When the protective layer 50 is formed of zirconia or alumina and has a thickness d of 1 μm or more and 10 μm or less, a capacitance formed by the protective layer 50 between each of the first detection electrode 21 and the second detection electrode 22 and the liquid LQ has a large contributive influence on the impedance IMP (FIG. 6), but, according to the present embodiment, the conductivity of the liquid LQ can be measured with sufficient sensitivity over a wide conductivity range even under the influence. When Ed of the protective layer 50 is reduced, the influence can be suppressed, but sensor sensitivity is likely to be reduced due to reduction in electrical coupling between each of the first detection electrode 21 and the second detection electrode 22 and the liquid LQ. When a higher priority is given to higher sensitivity, a material for the protective layer 50 preferably has a high relative permittivity &, and, in terms of the foregoing, zirconia or alumina is preferable, and zirconia is more preferable. On the other hand, alumina is preferable to zirconia as the material for the protective layer 50 to suppress temperature dependence of the conductivity sensor 101. In terms of heat resistance of the conductivity sensor 101, alumina is preferable to zirconia as the material for the protective layer 50.

The protective layer 50 may be formed of the sintered body. Reduction in manufacturing efficiency due to formation of a protective layer formed of a non-sintered body is thereby avoided in the manufacture of the conductivity sensor. The protective layer 50 and the insulating layer 10 are the sintered body as an integral structure, so that a failure originating from an interface between them is less likely to occur. Characteristics such as chemical resistance and thermal shock resistance are thereby improved.

The insulating layer 10 and the protective layer 50 are each preferably formed of a ceramic insulator and are more preferably formed of the same material. A difference in shrinkage in the firing step for the manufacture of the conductivity sensor 101 is thereby suppressed. The protective layer 50 with no pinhole can thereby be obtained even when the protective layer 50 has a relatively small thickness d. The thickness d can thus be reduced while an effect of improving corrosion resistance and chemical resistance produced by the protective layer 50 is sufficiently obtained.

The portion to be the protective layer 50 is preferably formed by bonding of the green sheet 50G under pressure (FIG. 11). The protective layer 50 with no pinhole can thereby be obtained even when the protective layer 50 has a relatively small thickness d compared with a case where the portion is formed by application of a ceramic paste.

The first detection electrode 21 and the second detection electrode 22 are preferably formed of the refractory metal and are formed of platinum, tungsten, or cobalt, for example. Volatilization and melting of the electrodes in the firing step for the manufacture of the conductivity sensor 101 can thereby be avoided.

Embodiment 2

Figure 12:
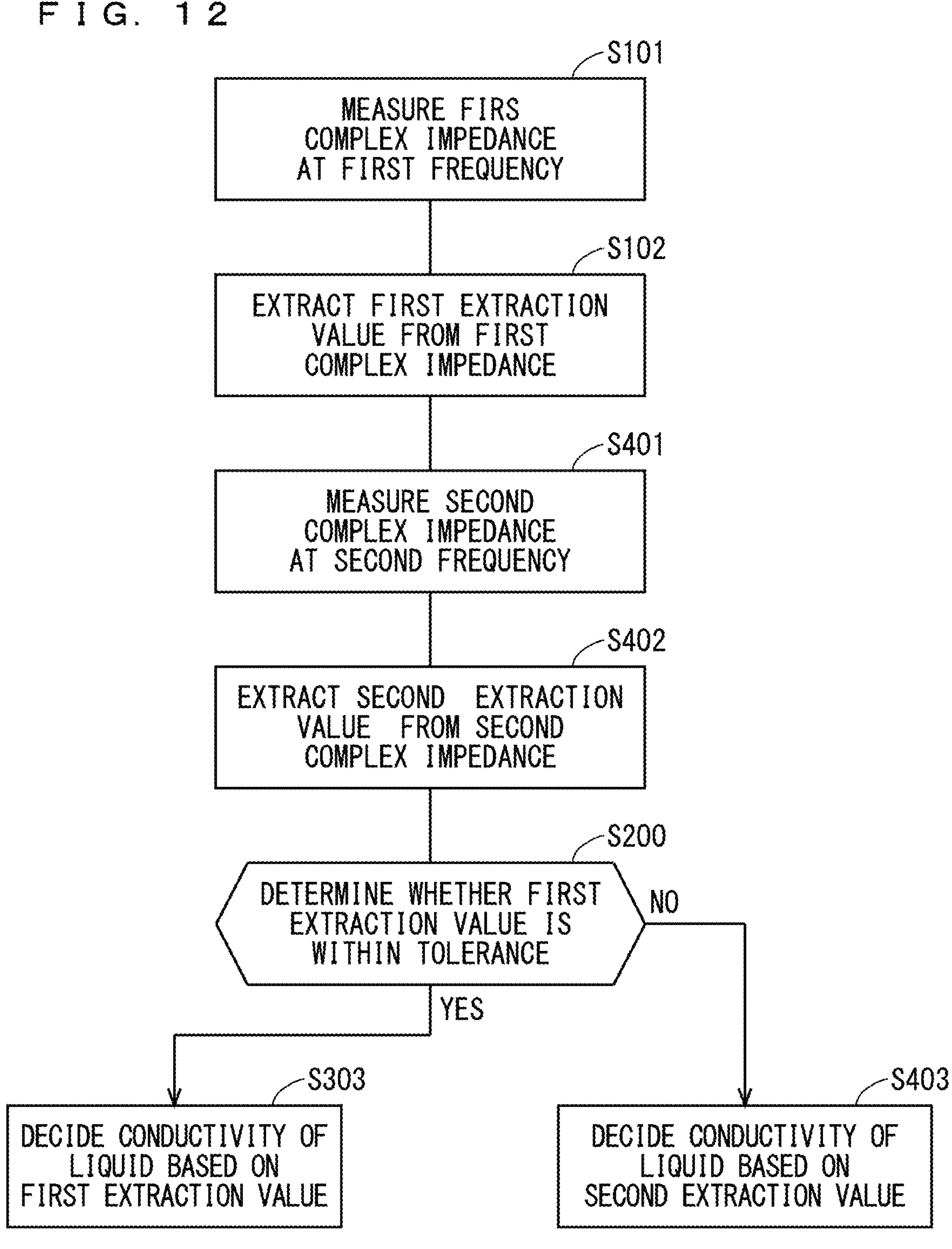
FIG. 12 is a schematic flowchart of a conductivity measurement method according to Embodiment 2.

In Embodiment 2, description will be made on another method of measuring the conductivity of the liquid LQ using a measurement system substantially similar to the measurement system 500 described in Embodiment 1 above. FIG. 12 is a schematic flowchart of a conductivity measurement method according to the present embodiment. Steps S101 and S102 are performed similarly to those in the above-mentioned conductivity measurement method (FIG. 10) according to Embodiment 1. On the other hand, steps S401 and S402 are performed before step S200 in Embodiment 2 in contrast to those in Embodiment 1. Thus, in the measuring instrument 200, the complex impedance measurement unit starts measurement in step S401 without depending on the determination unit in Embodiment 2 in contrast to that in Embodiment 1.

In step S200, whether the first extraction value is within the predetermined tolerance is determined as in Embodiment 1 above. When it is determined that the first extraction value is within the tolerance in step S200, the conductivity of the liquid LQ is decided based on the first extraction value in step S303 as in Embodiment 1. When it is determined that the first extraction value is outside the tolerance in step S200, the conductivity of the liquid LQ is decided based on the second extraction value in step S403.

The conductivity of the liquid LQ is thereby decided. According to the present embodiment, the second complex impedance has already been measured before step S200 and thus is not required to be measured after step S200.

While a method of using two frequencies, namely, the first frequency and the second frequency has been described in the present embodiment, more than two frequencies may be used as appropriate as a modification. In this case, measurement of a complex impedance at each of the more than two frequencies and extraction of the extraction value are performed before step S200. One of a plurality of extraction values based on which the conductivity of the liquid LQ is to be decided is then determined. The conductivity of the liquid LQ can thereby be decided using the optimum one of the more than two frequencies.

Characteristics according to Embodiment 2 other than the above-mentioned characteristics are substantially the same as those according to Embodiment 1 above, so that description thereof will not be repeated.

Embodiment 3

A conductivity sensor 102 (FIG. 13) according to Embodiment 3 will be described below, and the conductivity sensor 101 (FIG. 7) according to Embodiment 1 described above will additionally be described below.

Figure 13:
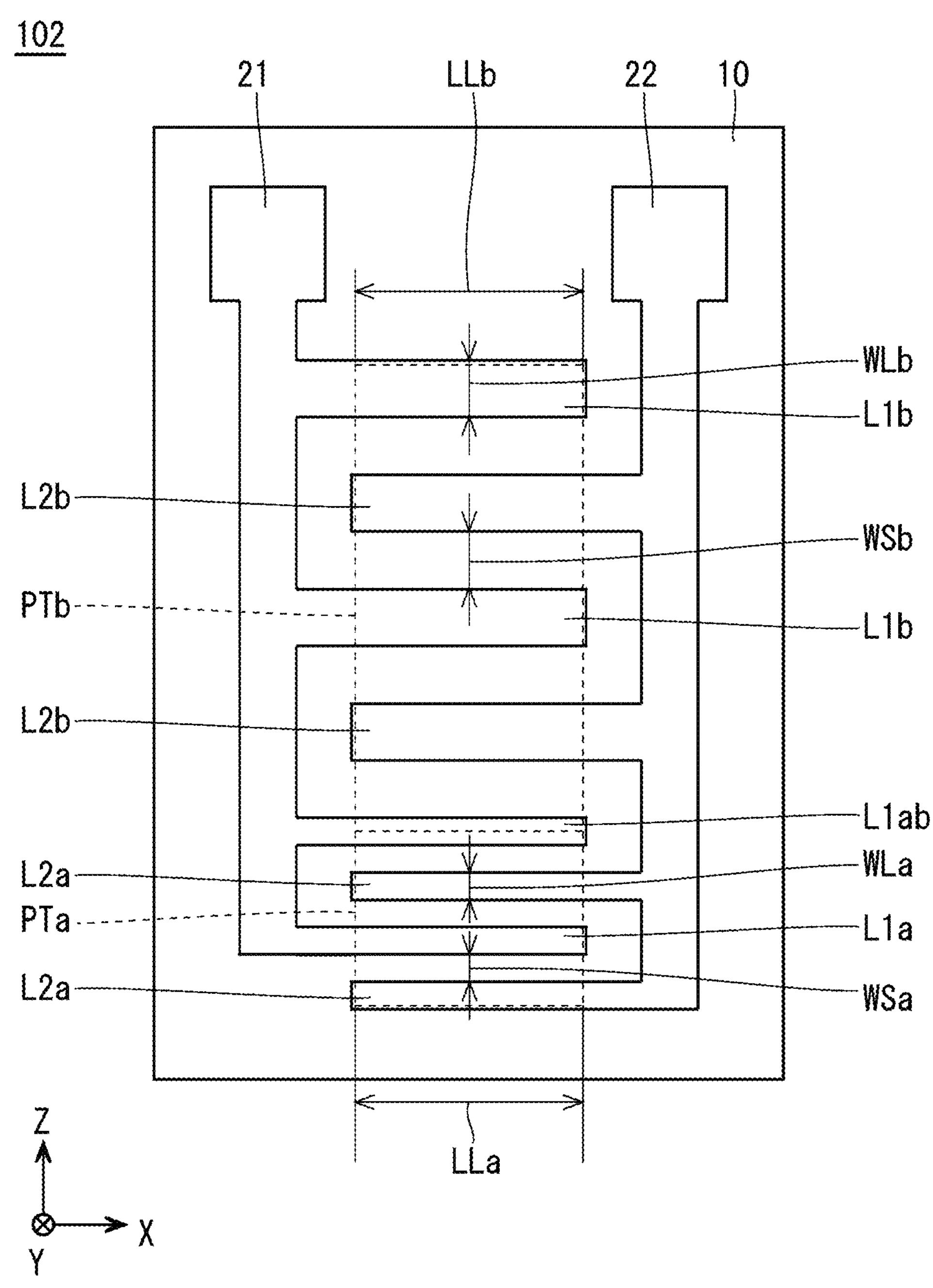
FIG. 13 is a schematic front view illustrating a configuration of a conductivity sensor according to Embodiment 3 without illustration of a protective layer.

FIG. 13 is a schematic front view illustrating a configuration of the conductivity sensor 102 according to the present embodiment without illustration of the protective layer 50. The first detection electrode 21 and the second detection electrode 22 are interdigitated in the conductivity sensor 102 to form a first line and space pattern PTa having a first space width WSa and a second line and space pattern PTb having a second space width WSb different from the first space width WSa. The second space width WSb is herein different from the first space width WSa. The first space width WSa may be 100 μm or less, and the second space width WSb may be more than 100 μm. The second space width WSb may be 10 times or more and 70 times or less the first space width WSa. FIG. 14, which will be described below, shows an example in which the second space width WSb is 20 times the first space width WSa, and, when a difference between them is required to be relatively small, the second space width WSb may be 10 times or more and 20 times or less the first space width WSa. The first line and space pattern PTa and the second line and space pattern PTb may each include a plurality of spaces. The first space width WSa may be 15 μm or more and may be 30 μm or more (in terms of a lower limit), for example. The second space width WSb may be 2000 μm or less and may be 1000 μm or less (in terms of an upper limit), for example.

In an example illustrated in FIG. 13, each of the line and space pattern PTa and the line and space pattern PTb has a length along the X direction and a width along the Z direction. The first line and space pattern PTa is formed by interdigitating at least one line (a line L1*a* and a line L1*ab* in FIG. 13) of the first detection electrode 21 and at least one line (a plurality of lines L2*a* in FIG. 13) of the second detection electrode 22. The second line and space pattern PTb is formed by interdigitating at least one line (lines L1*b* as a plurality of lines and the line L1*ab* in FIG. 13) of the first detection electrode 21 and at least one line (a plurality of lines L2*b* in FIG. 13) of the second detection electrode 22.

The first line and space pattern PTa and the second line and space pattern PTb share the single line L1*ab* to be adjacent to each other. While the line shared by the first line and space pattern PTa and the second line and space pattern PTb is the line L1*ab* of the first detection electrode 21 in the example of FIG. 13, the line may be a line of the second detection electrode 22 as a modification. A modification in which there is no shared line may be used, and, in this case, the first line and space pattern PTa and the second line and space pattern PTb may be away from each other.

The plurality of lines of the first line and space pattern PTa, that is, the line L1*a* and the lines L2*a* may each have a line length LLa of 1 mm or more and 20 mm or less. The plurality of lines of the second line and space pattern PTb, that is, the lines L1*b* and the lines L2*b* may each have a line length LLb of 1 mm or more and 20 mm or less. The line length LLa and the line length LLb may be the same as illustrated in FIG. 13 or may be different from each other. The line L1*ab* shared by the first line and space pattern PTa and the second line and space pattern PTb may have the line length LLa or the line length LLb.

The line L1*a* and the lines L2*a* of the first line and space pattern PTa may have a common line width WLa, and a dimension thereof is preferably 30 μm or more and 2000 μm or less and is more preferably 30 μm or more and 1000 μm or less. The lines L1*b* and the lines L2*b* of the second line and space pattern PTb may have a common line width WLb, and a dimension thereof is preferably 30 μm or more and 2000 μm or less and is more preferably 30 μm or more and 1000 μm or less. The line width WLb may be greater than the line width WLa. The line L1*ab* may have the line width WLa or the line width WLb.

FIG. 14 is a graphical representation showing results of simulation of a relationship between the conductivity of the liquid LQ and the absolute value of the admittance extracted from the complex impedance measured by the conductivity sensor at 1000 kHz for different line and space pattern configurations. In the figure, "50/50 μm+1000/1000 μm" corresponds to the conductivity sensor 102 (FIG. 13) according to Embodiment 3 in which L/S of the first line and space pattern PTa is 50/50 μm, and L/S of the second line and space pattern PTb is 1000/1000 μm. "50/50 μm" corresponds to the conductivity sensor 101 (FIG. 7) according to Embodiment 1 described above in which L/S of the line and space pattern PT is 50/50 μm. "1000/1000 μm" corresponds to the conductivity sensor 101 (FIG. 7) according to Embodiment 1 described above in which L/S of the line and space pattern PT is 1000/1000 μm. "1000/50 μm" corresponds to the conductivity sensor 101 (FIG. 7) according to Embodiment 1 described above having a line width WL of 1000 μm and a space width WS of 50 μm.

In the range of the conductivity shown in this graph, sensitivity of the capacitance value to the conductivity of the liquid LQ is much better in a conductivity range of 6 μS/cm or more in the conductivity sensor 101 of "50/50 μm", is difficult to detect in the entire range in the conductivity sensor 101 of "1000/1000 μm", is much better in a conductivity range of 10 μS/cm or more in the conductivity sensor 102 of "50/50 μm+1000/1000 μm", and is much better in a conductivity range of 40 μS/cm or more in the conductivity sensor 101 of "1000/50 μm". On the other hand, characteristics of the conductivity sensor preferably have not only a wide detectable range but also high linearity. In this regard, Table 6 below shows a coefficient of determination $R^2$ of a regression line in a conductivity range of 1 μS/cm to 500 μS/cm.

TABLE 6

| L/S | MEASUREMENT FREQUENCY | DETECTABLE CONDUCTIVITY (μS/cm) | | CORRELATION FUNCTION $R^2$ |
|---|---|---|---|---|
| (μm) | (kHz) | MINIMUM | MAXIMUM | (1-500 μS/cm) |
| 50/50 | 1000 | 6 | 600 | 0.934 |
| 1000/1000 | | — | — | 0.995 |
| 50/50 + 1000/1000 | | 10 | 500 | 0.940 |
| 1000/50 | | 40 | 500 | 0.997 |

It is found that the conductivity sensor 101 of "1000/50" μm has a coefficient of determination $R^2$ closest to one and thus has the highest linearity. This conductivity sensor is thus considered to be most desirable when high linearity is required. On the other hand, the conductivity sensor 102 of "50/50+1000/1000" is considered to have a relatively good balance between a wide range of the detectable conductivity and high linearity. The conductivity sensor 101 of "1000/1000" has high linearity, but the range of the detectable conductivity cannot be obtained under this simulation condition.

Table 7 below shows results of simulation of the detectable conductivity at various frequencies.

TABLE 7

| L/S | MEASUREMENT | DETECTABLE CONDUCTIVITY (μS/cm) | |
|---|---|---|---|
| (μm) | FREQUENCY (kHz) | MINIMUM | MAXIMUM |
| 50/50 | 1 | 0.01 | 7 |
| | 10 | 0.01 | 30 |
| | 100 | 0.01 | 100 |
| | 1000 | 6 | 600 |
| 1000/1000 | 1 | 0.01 | 100 |
| | 10 | 0.01 | 500 |
| | 100 | 5 | 1000 |
| | 1000 | — | — |
| 50/50 + 1000/1000 | 1 | 0.01 | 80 |
| | 10 | 0.01 | 200 |
| | 100 | 0.1 | 200 |
| | 1000 | 10 | 500 |
| 1000/50 | 1 | 0.01 | 70 |
| | 10 | 0.01 | 300 |
| | 100 | 0.5 | 1000 |
| | 1000 | 40 | 500 |

In the results for "1000/50" in Table 7 shown above, the maximum value of the detectable conductivity can be increased by using a frequency that is high to some extent but is rather reduced when an excessively high frequency is used. This is because, due to an increase in measurement frequency, the range of the conductivity in which detection sensitivity is relatively high shifts to a higher conductivity, but a change in admittance (more generally, a change in extraction value) as a whole becomes gradual. In terms of the foregoing, the measurement frequency is often preferably 100 kHz or less.

FIG. 15 is a graphical representation showing results of simulation of a relationship between the conductivity of the liquid LQ and the absolute value of the admittance extracted from the complex impedance measured by the conductivity sensor at 100 kHz for different line and space pattern configurations. As is seen from these results, at 100 kHz, a configuration having an L/S dimension of "1000/50" (more generally, a configuration in which the L dimension is greater than the S dimension) has higher sensitivity and higher linearity over a wide conductivity range than a configuration in which the L dimension and the S dimension have the same value or a combination thereof. In terms of the foregoing, the L dimension is preferably 2.5 times or more the S dimension and may be 10 times or more the S dimension. In terms of avoidance of an excessive increase in size of the sensor, however, the L dimension is 40 times or less the S dimension, for example.

A conductivity measurement method according to Embodiment 3 is similar to that according to Embodiment 1 or 2 above, so that description thereof will not be repeated.

The linearity of the extraction value over a wide conductivity range can be increased also according to the present embodiment. The range of the conductivity in which the conductivity of the liquid can be measured with sufficient sensitivity and sufficient linearity can thus be increased.

It is predicted that the results of simulation at the frequencies of 1 kHz, 10 kHz, 100 kHz, and 1000 kHz shown in each embodiment described above respectively roughly reflect characteristics on the order of 1 kHz, 10 kHz, 100 kHz, and 1000 kHz. In particular, characteristics at frequencies of 1 kHz+10%, 10 KHz+10%, 100 kHz+10%, and 1000 KHz+10% are respectively considered to be roughly the same as the characteristics at the frequencies of 1 kHz, 10 kHz, 100 kHz, and 1000 kHz disclosed above according to the study conducted by the inventors.

Characteristics with the dimension L and the dimension S in the results of simulation shown in each embodiment are considered to be roughly the same as characteristics with a dimension L±10% and a dimension S±10%.

Embodiments and modifications described above may freely be combined with each other. While the present invention has been described in detail, the foregoing description is in all aspects illustrative and not restrictive. It is understood that numerous unillustrated modifications can be devised without departing from the scope of the present invention.

What is claimed is:

1. A conductivity measurement method of measuring a conductivity of a liquid using a conductivity sensor, the conductivity sensor including an insulating layer, a first detection electrode provided on the insulating layer, a second detection electrode provided on the insulating layer away from the first detection electrode, and a protective layer covering the first detection electrode and the second detection electrode and formed of an insulator, the conductivity measurement method comprising:

a) measuring a first complex impedance between the first detection electrode and the second detection electrode at a first frequency with the liquid being in contact with the protective layer to face each of the first detection electrode and the second detection electrode through the protective layer;

b) extracting a first extraction value from the first complex impedance according to a predetermined extraction rule;

c) determining whether the first extraction value is within a predetermined tolerance;

d) deciding the conductivity of the liquid based on the first extraction value when it is determined that the first extraction value is within the tolerance in c); and e) deciding the conductivity of the liquid based on a second extraction value when it is determined that the first extraction value is outside the tolerance in c), the second extraction value being extracted according to the extraction rule from a second complex impedance between the first detection electrode and the second detection electrode at a second frequency different from the first frequency with the liquid being in contact with the protective layer to face each of the first detection electrode and the second detection electrode through the protective layer.

2. The conductivity measurement method according to claim 1, wherein the extraction rule corresponds to extraction of a reactive component from a complex impedance.

3. The conductivity measurement method according to claim 2, wherein when the first extraction value is greater than the tolerance in c), the second frequency is higher than the first frequency in e).

4. The conductivity measurement method according to claim 2, wherein when the first extraction value is smaller than the tolerance in c), the second frequency is lower than the first frequency in e).

5. The conductivity measurement method according to claim 1, wherein the extraction rule corresponds to extraction of an absolute value of an admittance from a complex impedance.

6. The conductivity measurement method according to claim 5, wherein when the first extraction value is greater than the tolerance in c), the second frequency is higher than the first frequency in e).

7. The conductivity measurement method according to claim 5, wherein when the first extraction value is smaller than the tolerance in c), the second frequency is lower than the first frequency in e).

8. The conductivity measurement method according to claim 1, wherein the extraction rule corresponds to extraction of an absolute value of an impedance from a complex impedance.

9. The conductivity measurement method according to claim 8, wherein when the first extraction value is greater than the tolerance in c), the second frequency is lower than the first frequency in e).

10. The conductivity measurement method according to claim 8, wherein when the first extraction value is smaller than the tolerance in c), the second frequency is higher than the first frequency in e).

11. The conductivity measurement method according to claim 1, wherein e) comprises e1) measuring the second complex impedance only when it is determined that the first extraction value is outside the tolerance in c).

12. The conductivity measurement method according to claim 1, further comprising f) before c), measuring the second complex impedance.

13. The conductivity measurement method according to claim 1, wherein the first detection electrode and the second detection electrode are interdigitated in the conductivity sensor to form a line and space pattern having a line width and a space width, the space width being 200 μm or less.

14. The conductivity measurement method according to claim 1, wherein the first detection electrode and the second detection electrode are interdigitated in the conductivity sensor to form a line and space pattern having a line width and a space width, the line width being 500 μm or more.

15. The conductivity measurement method according to claim 1, wherein the first detection electrode and the second detection electrode are interdigitated in the conductivity sensor to form a line and space pattern having a line width and a space width, the space width being 200 μm or less, the line width being 500 μm or more.

16. The conductivity measurement method according to claim 15, wherein at least one of the first frequency and the second frequency is a frequency on the order of 100 kHz.

17. The conductivity measurement method according to claim 1, wherein the first detection electrode and the second detection electrode are interdigitated in the conductivity sensor to form a first line and space pattern having a first space width and a second line and space pattern having a second space width different from the first space width.

18. The conductivity measurement method according to claim 17, wherein the first space width is 100 μm or less, and the second space width is more than 100 μm.

19. The conductivity measurement method according to claim 17, wherein the second space width is 10 times or more and 70 times or less the first space width.

20. The conductivity measurement method according to claim 17, wherein the first line and space pattern and the second line and space pattern share a single line to be adjacent to each other.

* * * * *